US010281264B2

(12) United States Patent
Higo et al.

(10) Patent No.: US 10,281,264 B2
(45) Date of Patent: May 7, 2019

(54) THREE-DIMENSIONAL MEASUREMENT APPARATUS AND CONTROL METHOD FOR THE SAME

(71) Applicant: CANON KABUSHIKI KAISHA, Tokyo (JP)

(72) Inventors: Tomoaki Higo, Tokyo (JP); Toshihiro Kobayashi, Tokyo (JP); Masayoshi Yamasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 489 days.

(21) Appl. No.: 14/951,728

(22) Filed: Nov. 25, 2015

(65) Prior Publication Data

US 2016/0156899 A1    Jun. 2, 2016

(30) Foreign Application Priority Data

Dec. 1, 2014  (JP) .................................. 2014-243374
Oct. 6, 2015  (JP) .................................. 2015-198797

(51) Int. Cl.
*G01B 11/25* (2006.01)
*G01B 11/03* (2006.01)

(52) U.S. Cl.
CPC .......... *G01B 11/25* (2013.01); *G01B 11/2545* (2013.01)

(58) Field of Classification Search
CPC ........... H04N 13/0282; H04N 13/0242; H04N 13/02; G01B 11/03; G01B 11/25; G01B 11/2545

(Continued)

(56) References Cited

U.S. PATENT DOCUMENTS

2007/0177160 A1* 8/2007 Sasaki ............... G01B 11/2518
                                                         356/603
2009/0067178 A1* 3/2009 Huang ................ G02B 5/0242
                                                         362/326

(Continued)

FOREIGN PATENT DOCUMENTS

JP    2008-281339 A    11/2008
JP    2012-251893 A    12/2012
JP    2013-019890 A    1/2013

OTHER PUBLICATIONS

Donner et al., "An Empirical BSSRDF Model", ACM Transactions on Graphics, vol. 28, No. 3, 2009, pp. 1-10.

*Primary Examiner* — Francis Geroleo
(74) *Attorney, Agent, or Firm* — Carter, DeLuca & Farrell LLP

(57) ABSTRACT

A three-dimensional measurement apparatus including: a projection unit configured to project a pattern onto a measurement target object from one or more projection directions; and an image capturing unit configured to obtain one or more captured images by capturing an image of the measurement target object from one or more view points. The three-dimensional measurement apparatus obtains a position of the pattern projected onto the measurement target object based on the one or more captured images obtained by the image capturing unit, and calculates three-dimensional coordinates of a surface of the measurement target object based on the position of the pattern obtained from the one or more captured images and a position of the pattern estimated based on a parameter set that represents internal scattering of the measurement target object.

19 Claims, 22 Drawing Sheets

(58) Field of Classification Search
USPC .......................................................... 348/159
See application file for complete search history.

(56) References Cited

U.S. PATENT DOCUMENTS

| | | | | |
|---|---|---|---|---|
| 2010/0290060 | A1* | 11/2010 | Mohazzab | G01B 11/25 356/492 |
| 2011/0211066 | A1* | 9/2011 | Fujiki | H04N 7/181 348/135 |
| 2011/0263955 | A1* | 10/2011 | Narita | A61B 1/00165 600/341 |
| 2012/0062716 | A1* | 3/2012 | Dillon | A61C 9/006 348/66 |
| 2012/0089364 | A1* | 4/2012 | Takabayashi | G01B 11/25 702/167 |
| 2012/0236317 | A1* | 9/2012 | Nomura | G01B 11/026 356/610 |
| 2013/0010080 | A1* | 1/2013 | Ray | G01B 11/2527 348/47 |
| 2013/0076857 | A1* | 3/2013 | Kurashige | G01B 11/25 348/40 |
| 2013/0293684 | A1* | 11/2013 | Becker | G01B 11/245 348/47 |
| 2015/0204662 | A1* | 7/2015 | Kobayashi | G01B 11/2513 356/610 |
| 2016/0102972 | A1* | 4/2016 | Kobayashi | G01B 11/25 356/610 |

* cited by examiner

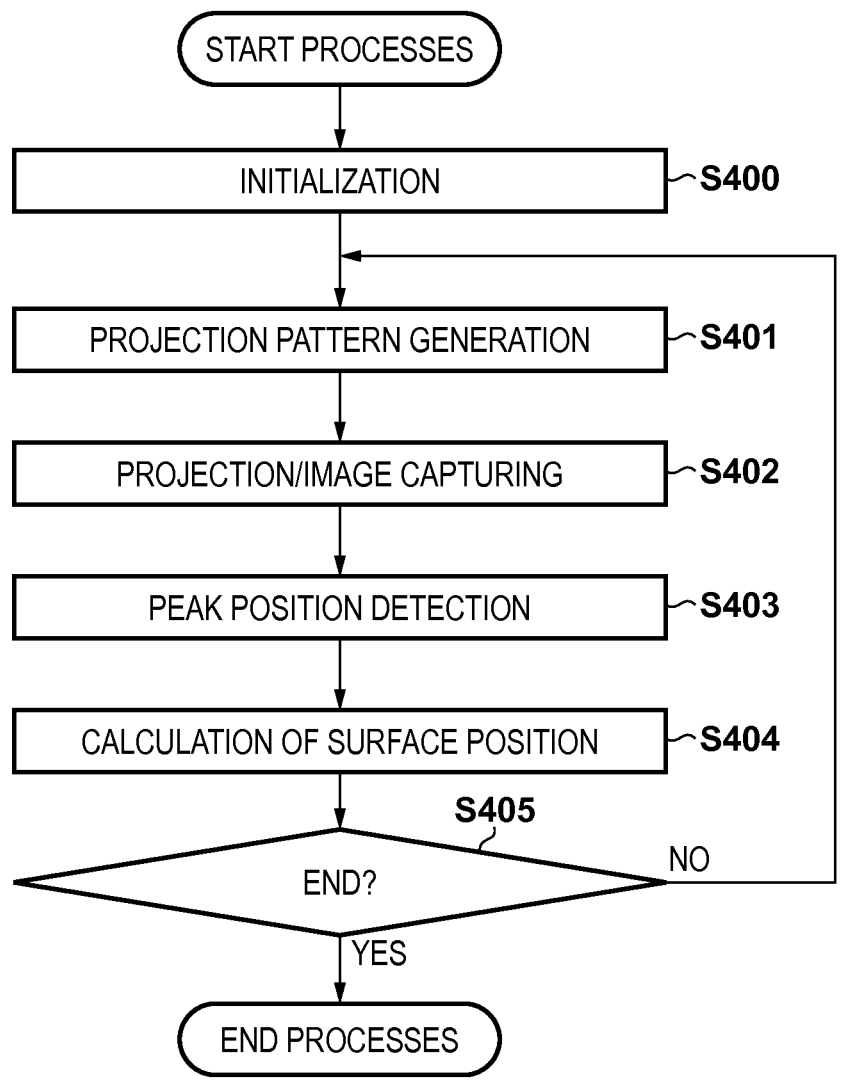

AREA OF MEASUREMENT TARGET OBJECT
ONTO WHICH SLIT LIGHT RAY IS PROJECTED

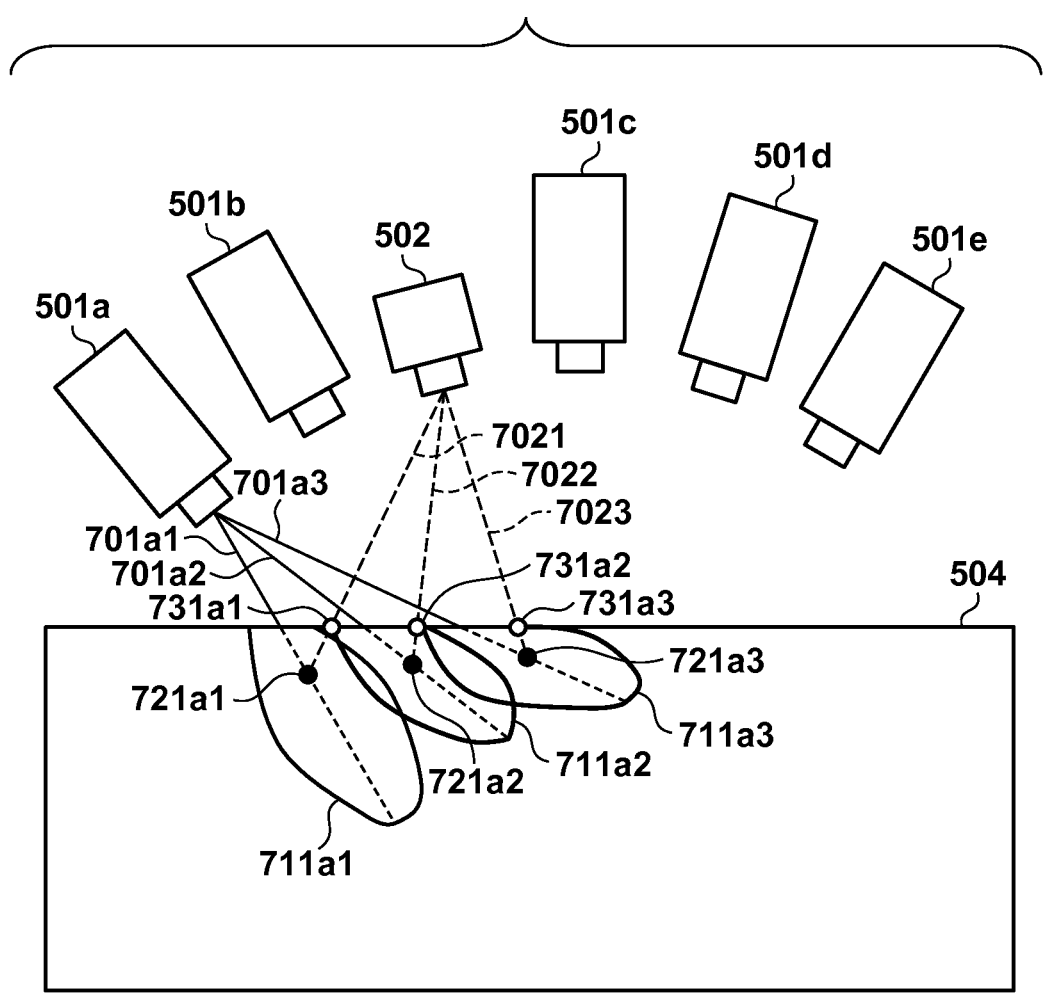
F I G. 17

F I G. 21
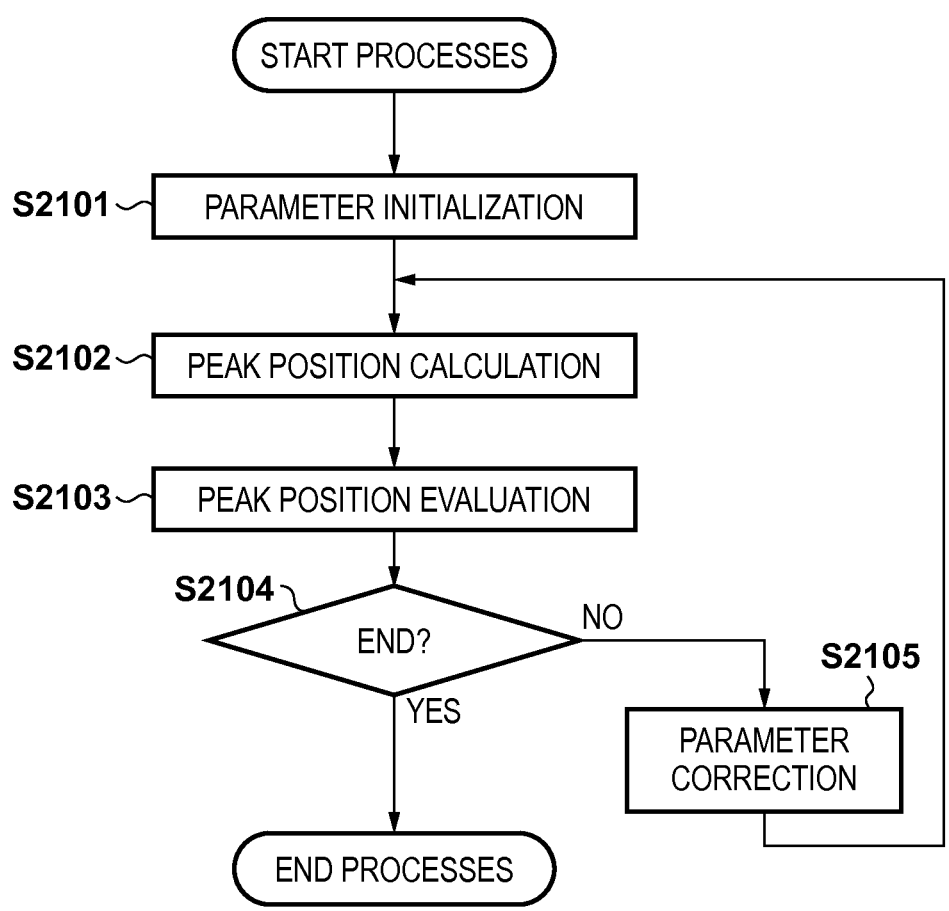

FIG. 22
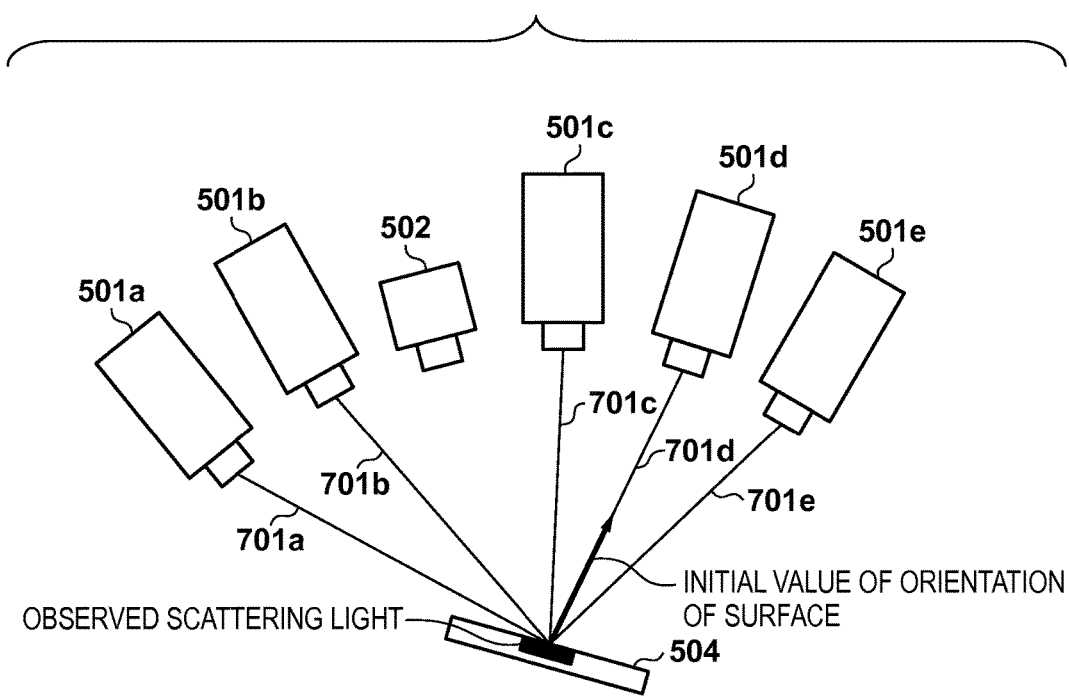
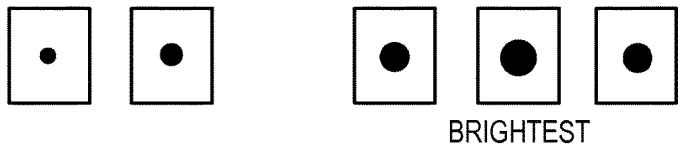
BRIGHTEST
SPOT LIGHT RAYS OBSERVED UNDER INFLUENCES OF INDIVIDUAL PROJECTION UNITS

THREE-DIMENSIONAL MEASUREMENT APPARATUS AND CONTROL METHOD FOR THE SAME

BACKGROUND OF THE INVENTION

Field of the Invention

The present invention relates to a three-dimensional measurement apparatus that measures three-dimensional coordinates of a target object, and a control method for the same.

Description of the Related Art

There is a widely-known three-dimensional measurement apparatus that projects a pattern of light onto a measurement target object by using a projection apparatus such as a projector, and obtains the three-dimensional coordinates of the measurement target object by using the principle of triangulation, based on the position of reflection light observed by an image capturing apparatus. Representative examples of three-dimensional measurement techniques available for this kind of three-dimensional measurement apparatus include a light-section method and a spatial encoding method. With such a three-dimensional measurement apparatus, the accuracy in measuring the three-dimensional coordinates greatly depends on the material of the measurement target object as described below.

For example, a measurement target object manufactured from plastic or the like typically causes, for example, a problem in which the measurement accuracy is degraded, or a problem in which measurement cannot be performed in the first place, due to the phenomenon called subsurface scattering or internal scattering of the pattern of light. Therefore, in the case of performing three-dimensional measurement of such a measurement target object, a treatment such as application of a white powder or the like to the surface of the measurement target object is required in advance, and this requirement is a factor that limits the applicable range of the three-dimensional measurement apparatus.

Usually, the following methods are used as methods for correcting the influence of the aforementioned internal scattering. Japanese Patent Laid-Open No. 2012-251893 (hereinafter referred to as Document 1) and Japanese Patent Laid-Open No. 2013-019890 (hereinafter referred to as Document 2) disclose that a table, which shows how the estimated value of depth changes due to the influence of the internal scattering, is preliminarily created using data obtained by measuring an object having scattering properties (internal scattering (subsurface scattering) properties) that are similar to those of the measurement target object. For three-dimensional measurement of the measurement target object, this disclosure makes it possible to correctly measure the three-dimensional shape of the measurement target object including a translucent portion by correcting the value of depth using the table. Also, Japanese Patent Laid-Open No. 2008-281339 (Document 3) discloses a method for performing three-dimensional measurement while eliminating the influence of internal scattering by separating a direct reflection light component, which is reflected off the surface of an object, and an internal scattering component, which scatters inside the translucent object, using a polarizing plate. According to Document 3, it is possible to correctly measure the three-dimensional shape of the measurement target object including a translucent portion by using the direct reflection light component from which the internal scattering component has been removed.

According to both Documents 1 and 2, a measurement value, which is obtained from a captured image obtained by an image capturing apparatus performing image capturing from a single view point, is corrected by using correction information, which has been preliminarily obtained for an object that has the same scattering properties as those of the measurement target object. Therefore, it is necessary to prepare a reference object that has the same scattering properties as those of the measurement target object and to preliminarily perform detailed measurement by other means. In addition, the degree of improvement in the measurement accuracy that can be expected to be achieved by making a correction is limited. Also, there are some surface orientations with which almost no direct reflection light component can be observed, depending on the geometric relationship among the position of the projection apparatus, the position of the image capturing apparatus, the orientations of the surfaces of the measurement target object, etc. Furthermore, there are some cases where almost no direct reflection light component can be observed, depending on the degree of translucence, such as the transmittance, of the measurement target object. Therefore, by the method according to Document 3, it will be impossible to perform three-dimensional measurement if no direct reflection light can be observed as described above. Therefore, by measurement based on the direct reflection light component as disclosed in Document 3, there are at least some measurement target objects that cannot be handled, depending on the material, etc.

SUMMARY OF THE INVENTION

Embodiments of the present invention provide a three-dimensional measurement apparatus that is capable of performing three-dimensional measurement of a measurement target object with improved accuracy, and a control method for the same.

According to one aspect of the present invention, there is provided a three-dimensional measurement apparatus, comprising: a projection unit configured to project a pattern onto a measurement target object from one or more projection directions; an image capturing unit configured to obtain one or more captured images by capturing an image of the measurement target object from one or more view points; an obtaining unit configured to obtain, from the one or more captured images, a position of the pattern projected onto the measurement target object; and a calculating unit configured to calculate three-dimensional coordinates of a surface of the measurement target object based on the position of the pattern obtained by the obtaining unit and a position of a pattern estimated based on a parameter set that represents internal scattering of the measurement target object.

According to another aspect of the present invention, there is provided a control method of a three-dimensional measurement control apparatus, the method comprising: projecting a pattern onto a measurement target object from one or more projection directions; obtaining one or more captured images by capturing an image of the measurement target object from one or more view points; obtaining, from the one or more captured images, a position of the pattern projected onto the measurement target object; and calculating three-dimensional coordinates of a surface of the measurement target object based on the position of the pattern obtained from the one or more captured images and a position of the pattern estimated based on a parameter set that represents internal scattering of the measurement target object.

Furthermore, according to another aspect of the present invention, there is provided a non-transitory computer readable storage medium storing therein a program for causing a computer to perform a three-dimensional measurement control method, the three-dimensional measurement control method comprising: projecting a pattern onto a measurement target object from one or more projection directions; obtaining one or more captured images by capturing an image of the measurement target object from one or more view points; obtaining, from the one or more captured images, a position of the pattern projected onto the measurement target object; and calculating three-dimensional coordinates of a surface of the measurement target object based on the position of the pattern obtained from the one or more captured images and a position of the pattern estimated based on a parameter set that represents internal scattering of the measurement target object.

Further features of the present invention will become apparent from the following description of exemplary embodiments with reference to the attached drawings.

BRIEF DESCRIPTION OF THE DRAWINGS

FIG. 4 is a flowchart showing a flow of processes according to the first embodiment.

FIG. 17 is a diagram showing peak positions that can be seen from an image capturing apparatus when scanning is performed with a spot light ray from a projection apparatus.

FIG. 21 is a flowchart showing processes of surface position calculation according to the fourth embodiment.

FIG. 22 is a diagram showing how to obtain an initial value of an orientation of a surface according to the fourth embodiment.

DESCRIPTION OF THE EMBODIMENTS

The following describes some preferable embodiments of the present invention with reference to the accompanying drawings.

First Embodiment

A three-dimensional measurement apparatus according to a first embodiment projects a slit light ray from a laser light source onto a measurement target object, observes the situation from a plurality of view points with a plurality of cameras, and obtains the correspondence relationship between the light source and each camera (each view point). Then, the three-dimensional measurement apparatus determines a parameter set, which includes parameters concerning: the surface position of the slit light ray on the surface of the measurement target object; the orientation of the surface; and the scattering properties, based on the correspondence relationship obtained from the plurality of view points, and the three-dimensional measurement apparatus thus realizes measurement of the three-dimensional coordinates, i.e., the three-dimensional shape, of the surface of the measurement target object.

Figure 1:
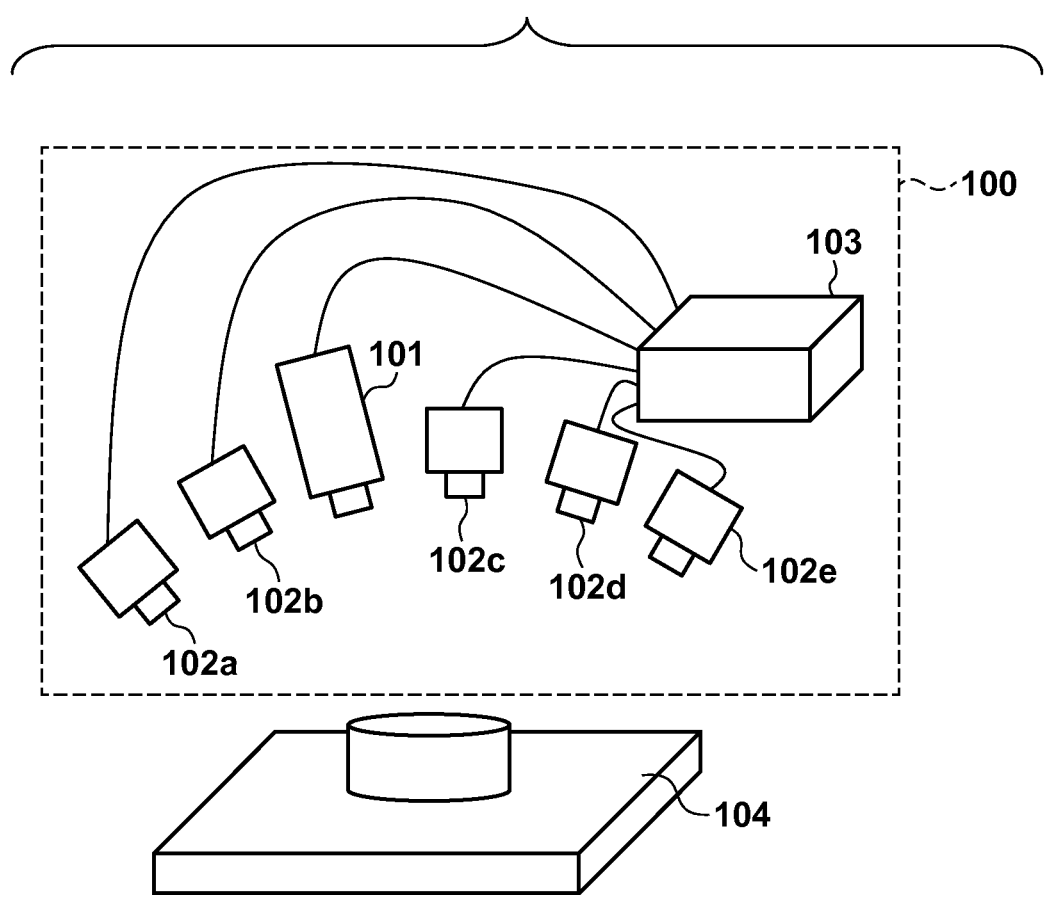
FIG. 1 is a diagram showing an example of a configuration of a three-dimensional measurement apparatus according to a first embodiment.

FIG. 1 is a diagram showing an example of the configuration of the three-dimensional measurement apparatus according to the first embodiment. A reference numeral 100 denotes the three-dimensional measurement apparatus, which measures the three-dimensional shape of the measurement target object. A reference numeral 101 denotes a projection apparatus, reference numerals 102a to 102e denote image capturing apparatuses, a reference numeral 103 denotes a control apparatus, and a reference numeral 104 denotes a measurement target object. In the three-dimensional measurement apparatus 100 having such a configuration, the projection apparatus 101 projects a pattern of light, which is described below, onto the measurement target object 104. The pattern of light is reflected off the surface of the measurement target object 104, or scatters inside the measurement target object 104, and is subjected to image capturing performed by the image capturing apparatuses 102a to 102e. The position and orientation of each of the image capturing apparatuses 102a to 102e relative to the projection apparatus 101 are known. The images captured by the image capturing apparatuses 102a to 102e (captured images) are transmitted to the control apparatus 103. Using a computer and electrical circuitry provided inside, the control apparatus 103 controls the operations of the projection apparatus 101 and the image capturing apparatuses 102a to 102e.

Figure 2:
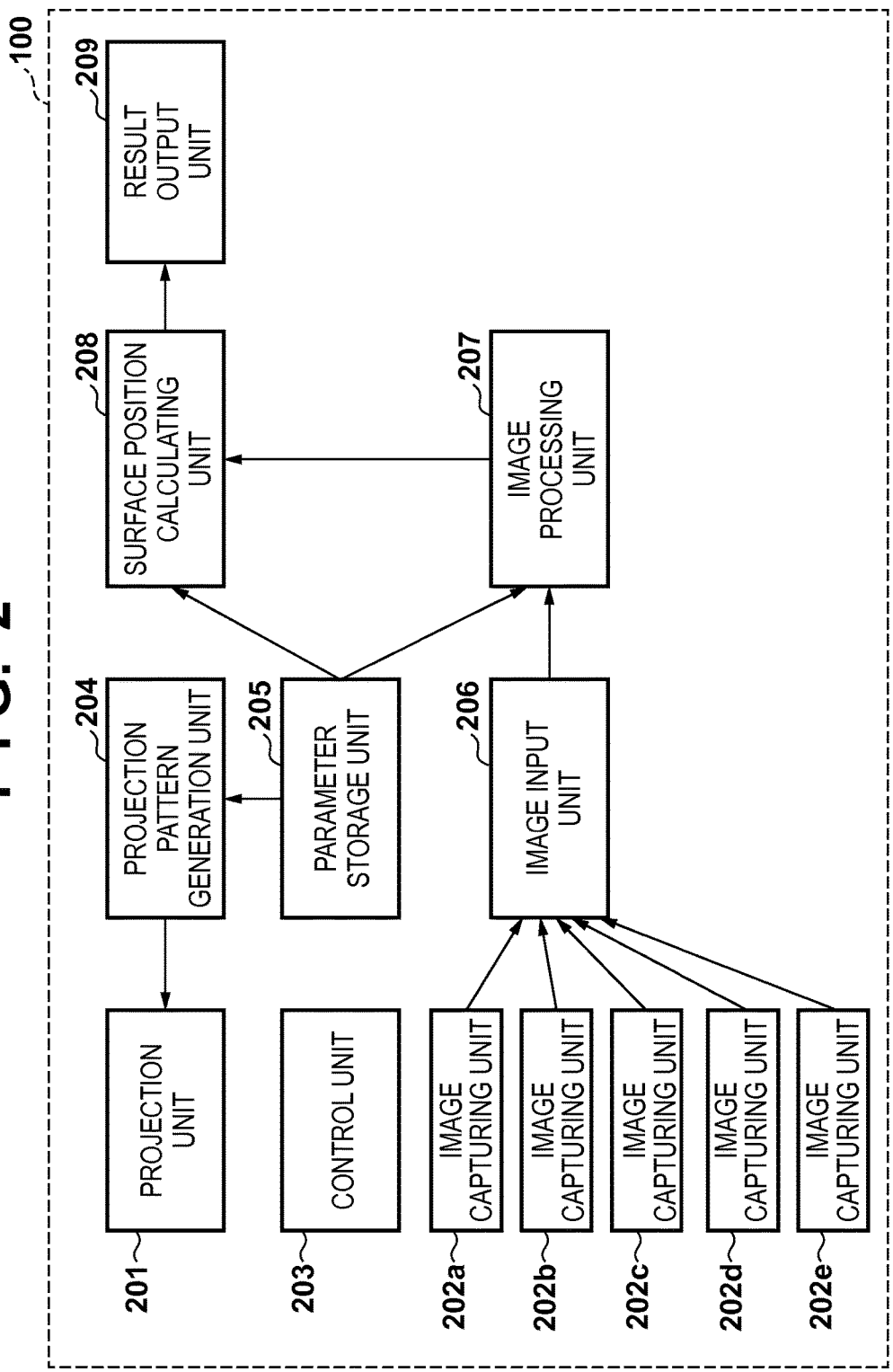
FIG. 2 is a functional block diagram of the three-dimensional measurement apparatus according to the first embodiment.

FIG. 2 is a functional block diagram showing an example of the functional configuration of the three-dimensional measurement apparatus 100 according to the first embodiment. A projection unit 201 drives the projection apparatus 101 to project a pattern of light, which has been generated by a projection pattern generation unit 204, onto a measurement area including the measurement target object 104. Note that projection is controlled by the projection unit 201 receiving a projection control signal, which is transmitted from a control unit 203. The functions of the projection unit 201 are realized by the projection apparatus 101.

Image capturing units 202a to 202e realize an image capturing function, which is the function of obtaining a plurality of captured images by capturing images of the measurement area, which includes the measurement target object 104, from a plurality of view points. For example, the image capturing units 202a to 202e each receive an image capturing control signal, which is transmitted from the control unit 203, and capture an image of the measurement area by driving the image capturing apparatuses 102a to 102e according to the timing of receiving the image capturing control signal such that the shutter speed, the aperture, and the focal position that have been specified in advance are achieved. Note that the image capturing control signals to be transmitted to the image capturing units 202a to 202e are not necessarily synchronous for all the image capturing units, insofar as a plurality of captured images can be obtained from the individual image capturing apparatuses under the condition that the orientation (position) of the slit light ray projected by the projection unit 201 remains unchanged.

The images captured by the image capturing apparatuses 102a to 102e are transmitted to an image input unit 206 via the image capturing units 202a to 202e. The functions of the image capturing units 202a to 202e are realized by the image capturing apparatuses 102a to 102e. In the present embodiment, five view points are illustrated as the plurality of view points and a description is given on the assumption that there are five image capturing apparatuses. However, the number is not limited to five. Also, it is not always required that the number of image capturing apparatuses corresponds to the number of view points, and image capturing from a plurality of view points may be achieved by attaching a single image capturing apparatus to the tip of a robot hand for example, and moving the image capturing apparatus while controlling the position and orientation thereof. Alternatively, the same results as those of multi-view point image capturing may be obtained by fixing the positions of the measurement target object 104 and the projection unit 201 relative to each other and moving the measurement target object by using a rotary table or the like.

The projection pattern generation unit 204 generates a pattern that is required for obtaining the correspondence relationship between positions on the images captured by the image capturing units 202a to 202e and the position of the light ray projected by the projection unit 201. The following provides a description of the present embodiment on the assumption that a slit light ray, which is used in the light-section method, is projected. However, the pattern of light is not limited to a pattern of such slit light ray, and any well-known pattern of light available for three-dimensional measurement, such as a pattern of structured light, spot light, or a space partitioning image like a gray code may be used.

A parameter storage unit 205 retains various kinds of parameters that are required for performing three-dimensional measurement. The parameters include, for example, settings and calibration data sets used for controlling the projection unit 201 and the image capturing units 202a to 202e. Note that the functions of the parameter storage unit 205 are realized by the control apparatus 103. The image input unit 206 receives a plurality of images captured by the image capturing units 202a to 202e, and retains the images in a memory area, which is not shown in the drawings. Note that the image capturing units 202a to 202e each irradiate the measurement target object 104 with a slit light ray having a different orientation, and thus a plurality of images are captured. Therefore, the image input unit 206 sequentially receives, from the image capturing units 202a to 202e, input captured images corresponding to their respective slit light rays, and adds the captured images to the memory area. The image input unit 206 outputs the captured images retained in the memory area to an image processing unit 207. The functions of the image input unit 206 are realized by the control apparatus 103.

The image processing unit 207 receives, from the image input unit 206, the captured images obtained by the image capturing units 202a to 202e, and obtains, from the captured images respectively captured from the plurality view points, the image positions of the patterns of light projected onto the measurement target object 104, by performing the required image processing. Image processing performed by the image processing unit 207 includes mainly detection of peak positions, which are the image positions of the slit light rays, the process of smoothing the captured images, which is performed to make it easy to detect the peak positions, and so on. The functions of the image processing unit 207 are realized by the control apparatus 103. A surface position calculating unit 208 receives, for each view point, a pair of: the direction in which the corresponding slit light ray is projected; and the position of the corresponding image peak position, from the image processing unit 207, and receives the individual calibration data sets for the projection unit 201 and the image capturing units 202a to 202e from the parameter storage unit 205. The surface position calculating unit 208 then calculates accurate three-dimensional coordinates of the measurement target object 104 based on these pieces of information, and transmits the three-dimensional coordinates to a result output unit 209.

The result output unit 209 outputs the three-dimensional coordinates of the measurement target object 104 calculated by the surface position calculating unit 208. The output destinations include, for example, a display apparatus, another computer, and an auxiliary storage apparatus, which are connected to the control apparatus 103. In the present embodiment, the functions of the result output unit 209 are realized by the control apparatus 103.

The surface position calculating unit 208 according to the first embodiment calculates the three-dimensional coordinates of the surface of the measurement target object 104 by:
  obtaining the image positions of the patterns of light by, for example, performing a simulation based on the parameter set including the parameters concerning the scattering properties of the measurement target object 104 and the surface position on the measurement target object 104; and
  adjusting each parameter based on the image positions (the peak positions in the present embodiment) of the patterns of light obtained by the image processing unit 207, and the image positions of the patterns of light obtained based on the parameter set, and determining the parameter set.

More specifically, the surface position calculating unit 208 carries out the processes of:
  obtaining the image positions (the peak positions) of the patterns of light that are observed from the plurality of view points based on the state of scattering of the patterns of light obtained based on the individual parameters included in the parameter set;
  adjusting the parameters constituting the parameter set based on the image positions obtained from the captured images and the image positions obtained based on the state of scattering, and determining the parameter set; and calculating the three-dimensional coordinates based on the surface position included in the parameter set thus determined.

Here, the image positions based on the state of scattering can be obtained by, for example, obtaining the image positions (the peak positions in the present embodiment) of the patterns of light from images obtained by rendering the state of scattering according to the parameter set. The following provides a description of a phenomenon caused by reflection near the surface of the measurement target object 104 or by subsurface scattering, which occurs at the time of measurement, and of the principle by which the surface position calculating unit 208 determines (renders) the state of scattering of the patterns of light based on the phenomenon and obtains the surface position (three-dimensional coordinates) of the measurement target object 104.

Figure 3:
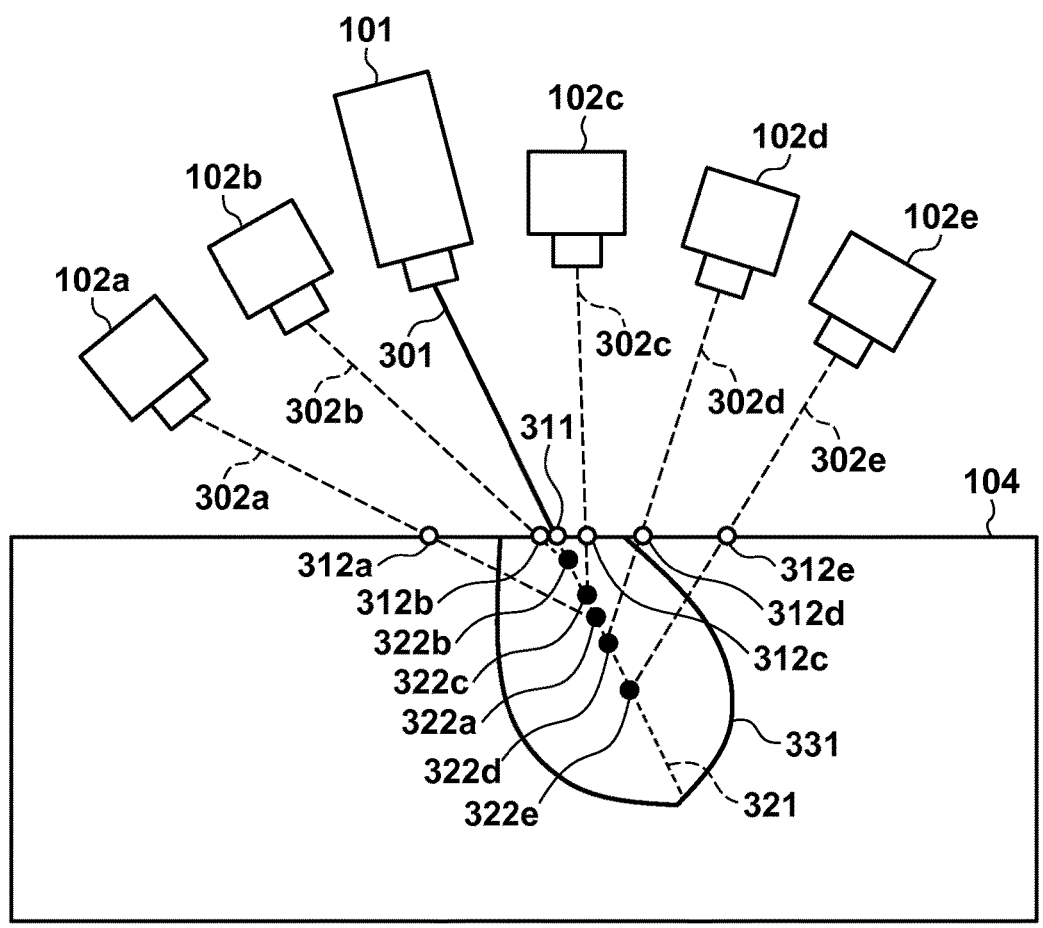
FIG. 3 is a diagram illustrating a subsurface scattering phenomenon according to the first embodiment.

FIG. 3 shows a subsurface scattering phenomenon occurring in the measurement target object 104. First, with reference to FIG. 3, a description is given of how the measurement target object 104, onto which projection light is projected from the projection apparatus 101, is observed by the image capturing apparatuses 102a to 102e. Of a slit light ray 301 projected from the projection apparatus 101 to a surface position 311 of the measurement target object 104, a portion is reflected off the surface of the object as reflection light (not shown in the drawings) and another portion enters the inside of the object and scatters (subsurface scattering). The portion of light that has entered the inside of the object is repeatedly reflected in a complicated manner while colliding against media or the like in the substance, and is observed as scattering light. The actions of such scattering light, which are uniquely determined according to the substance, is referred to as the scattering properties of the substance. For example, a difference in the scattering properties results in a difference in the distribution of areas that appear bright and a difference in the degree of scattering in an anisotropic or isotropic manner relative to the traveling direction of light. A reference numeral 331 denotes a lobe-shaped area that is observed to be bright due to scattering inside the object that is translucent.

Reference numerals 302a to 302e denote the directions of the peak positions of the observed light rays, which are obtained based on the images captured by the image capturing apparatuses 102a to 102e, and reference numerals 312a to 312e denote the peak positions of the observed light rays on the surface of the measurement target object 104. In this way, due to the influence of subsurface scattering, the peak positions observed from the individual image capturing apparatuses differ from each other according to the difference in the positions of their respective view points. Therefore, the three-dimensional coordinates estimated based on the peak positions do not represent the three-dimensional position on the surface of the measurement target object 104. A reference numeral 321 denotes an extension of the slit light ray 301 inside the measurement target object 104. Reference numerals 322a to 322e denote apparent three-dimensional measurement positions respectively corresponding to the image capturing apparatuses 102a to 102e. These three-dimensional measurement positions 322a to 322e are obtained by triangulation as the intersection of the slit light ray 301 and the intersection of its extension 321 with the peak position directions of the observed light rays obtained from the images captured by the image capturing apparatuses 102a to 102e. In this way, in the case where the three-dimensional coordinates of the surface of an object are obtained from the peak positions obtained from the captured images, the estimated three-dimensional positions differ according to the observation direction.

Next, a description is given of the principle by which the surface position on the measurement target object 104 is obtained from the peak position that is observed at different positions on the surface of the measurement target object 104 depending on the view point, due to the influence of subsurface scattering.

In the three-dimensional measurement apparatus 100, when the projection apparatus 101 projects a slit light ray in a given direction, the peak positions observed by the image capturing apparatuses 102a to 102e are determined depending on the position on the surface of the measurement target object 104, the orientation of the surface, and the scattering properties. In other words, the peak positions that will be observed can be obtained by reproducing scattering light, using rendering or a physical simulator used in CG, based on the position on the surface of the measurement target object 104, the orientation of the surface, and the scattering properties, which are provided as variables. When reproduction of scattering light is performed with correct variables, the peak positions that will be reproduced should be the same as the peak positions that will be actually observed (the peak positions that will be obtained from the captured images). The variables at the time the peak positions are the same correctly represent the position on the surface of the object to be measured. Therefore, it is only required to solve the problem of obtaining the variables (parameters) that equalize the peak positions to be reproduced and the peak position to be actually observed. Furthermore, it is possible to obtain the orientation of the surface and the scattering properties by using the variables that can be obtained at the same time. How to obtain the orientation of the surface and the scattering properties is described below with reference to the flowcharts shown in FIG. 4 and FIG. 7. Note that the influence of the reflection component reflected off the surface of a translucent object is often negligibly small compared to that of observed light with subsurface scattering and is not problematic in most cases. Therefore, the present embodiment shows an example of a configuration in which the influence of reflection light corresponding to the scattering properties is not considered.

Next, returning to FIG. 4, a description is given of the flow of three-dimensional measurement processes performed by the three-dimensional measurement apparatus 100 having the configuration above. First, when the apparatus is activated, initialization processes are performed in step S400. The initialization processes in step S400 include, for example, the process of activating the projection unit 201 and the image capturing units 202a to 202e, and the process of reading various kinds of parameters including the calibration data sets for the projection unit 201 and the image capturing units 202a to 202e and storing them to the parameter storage unit 205.

In step S401, the projection pattern generation unit 204 determines the direction in which the slit light ray is projected (projection direction), and transmits the projection pattern to the projection unit 201. In step S402, the projection unit 201 projects the slit light ray onto the measurement target object 104. The image capturing units 202a to 202e capture images of the measurement target object 104 onto which the slit light ray is projected, and the image input unit 206 retains the images obtained by image capturing as captured images. In step S403, the image processing unit 207 detects the peak position from each of the images captured by the image capturing units 202a to 202e using the slit light ray projected onto the measurement target object 104 (i.e., each of the captured images retained by the image input unit 206).

Figure 5C:
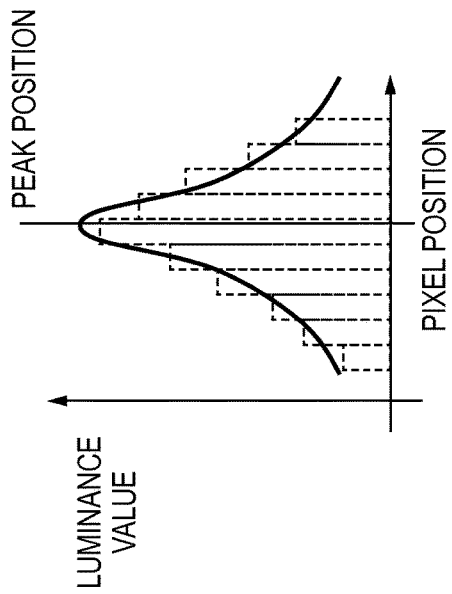
FIGS. 5A to 5C are diagrams showing a method for detecting a peak position.
Figure 5A:
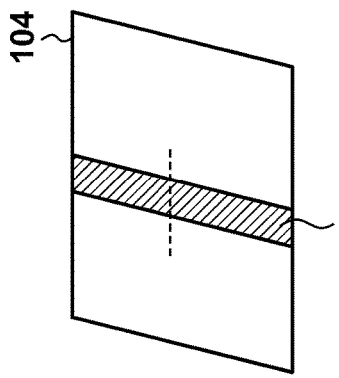
Figure 5B:
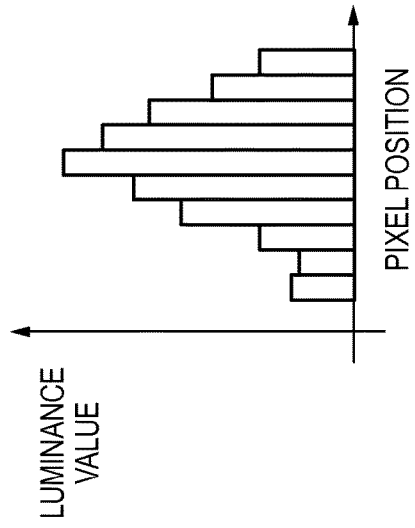

The following describes the method for detecting the peak position with reference to FIGS. 5A to 5C. FIG. 5A shows a situation in which a slit light ray is projected onto the measurement target object 104. FIG. 5B is a graph representing the pixel positions corresponding to the region indicated by the horizontal broken line in FIG. 5A, and the luminance values of the pixels. The image processing unit 207 detects the peak position by, for example, performing Gaussian-fitting after performing the smoothing process with respect to the intensity distribution of the slit light ray as shown in FIG. 5C. The coordinates of the detected peak position is retained in association with the projection direction of the slit light ray at the time.

Returning to FIG. 4, in step S404, the surface position calculating unit 208 calculates the three-dimensional coordinates of the surface position based on the scattering properties of the measurement target object 104, using the pair of the direction of the light ray and the coordinates of the peak positions of the captured images detected in step S403. The method for calculating the three-dimensional coordinates will be described later in detail. Next, in step S405, it is determined whether or not three-dimensional measurement for the regions specified by the user has ended, and when it has ended, the three-dimensional measurement processes according to the present embodiment end. When there is any measurement region that has not been measured, the processes above are repeated from step S401 again.

Figure 6:
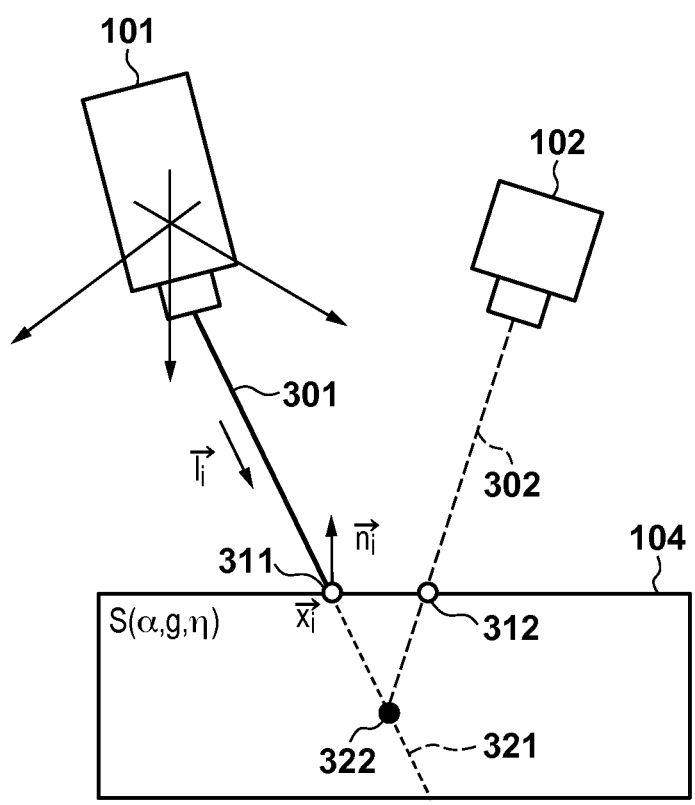
FIG. 6 is a diagram showing physical amounts (parameters) that are required for calculating three-dimensional coordinates of a surface position according to the first embodiment.

With reference to FIG. 6, the following describes physical amounts that are required for calculating the three-dimensional coordinates of the surface position on the measurement target object 104, and the parameters of the physical amounts. To simplify the description, it is assumed in the present embodiment that a local region of the measurement target object 104 is composed of flat surfaces. However, the shape is not necessarily represented by flat surfaces, and curved surfaces may be parameterized using a Bezier surface, a B-spline surface, an implicit function representation, or the like.

In a coordinate system with the point of origin inside the projection apparatus 101, when an $i^{th}$ slit light ray is projected from the projection apparatus 101 in the direction indicated by a vector $l_i$, a vector $x_i$, which indicates the three-dimensional position of the surface position 311, is represented by Expression 1 below.

$$\vec{x}_i(t) = t\vec{l}_i \quad \text{Expression 1}$$

The orientation of the surface at this position is represented by Expression 2 below.

$$\vec{n}_i(p, q) = \left(p, q, \frac{1}{\sqrt{p^2 + q^2 + 1}}\right) \quad \text{Expression 2}$$

The scattering properties are represented by Expression 3 below.

$$S(\sigma_s, \sigma_a, g, \eta) \approx (\alpha, g, \eta) \quad \text{Expression 3}$$

Note that a sign t denotes a parameter that represents the distance from the projection apparatus 101, signs p and q denote parameters each having a value within the range of −1 to 1, a sign $\sigma_s$ denotes a scattering coefficient, a sign $\sigma_a$ denotes an absorption coefficient, a sign g denotes an anisotropy parameter indicating the degree of anisotropy, a sign $\eta$ denotes a relative refraction index, and a sign $\alpha$ denotes an albedo. The specific contents of equation 3, which represents the scattering properties, may be the same as those of Donner, C. et al., "An Empirical BSSRDF Model", ACM Transactions on Graphics, vol. 28, No. 3, 2009 (hereinafter referred to as Document 4), and the detailed description thereof is omitted here. According to Document 4, the scattering properties can be approximated as shown in Expression 3. In the present embodiment, images that render the state of scattering observed from the image capturing apparatuses 102a to 102e are generated by using the rendering method disclosed in Document 4, and the luminance peak positions are thus obtained. By obtaining the parameters at the time when these peak positions are equal to the peak positions 312a to 312e actually observed by the image capturing apparatuses 102a to 102e, it is possible to obtain the three-dimensional position (vector $x_i$) at the incident surface position from the parameter t.

The parameter set required for rendering, which is concerned with the shape and the scattering properties, includes six parameters t, p, q, $\alpha$, g, and $\eta$. However, if it is assumed that the albedo $\alpha$ is constant in the local region, the peak position does not depend on the value of $\alpha$. Therefore, any value may be used as $\alpha$, and the five parameters other than $\alpha$ are unknown parameters. However, the parameters are not limited to these five parameters, and the number of parameters used as variables may vary, for example when a scattering properties model that is different from the model disclosed in Document 4 is used, or when the parameters are obtained by a physical simulation. Furthermore, regarding the number of image capturing apparatuses, the number of image capturing units required for calculation increases as the total number of parameters increases. While five view points (five image capturing apparatuses) are used in the present embodiment, the number of required view points (the number of required image capturing apparatuses) may vary depending on the scattering properties model. Usually, the number of required view points (image capturing apparatuses) increases as the number of parameters increases. In other words, the number of view points (image capturing apparatuses) is positively correlated with the number of parameters for the model representing the scattering properties. Preferably, the number of view points (image capturing apparatuses) constituting the plurality of view points is greater than or equal to the number of parameters that are adjusted and determined by the processes shown in FIG. 7.

Figure 7:
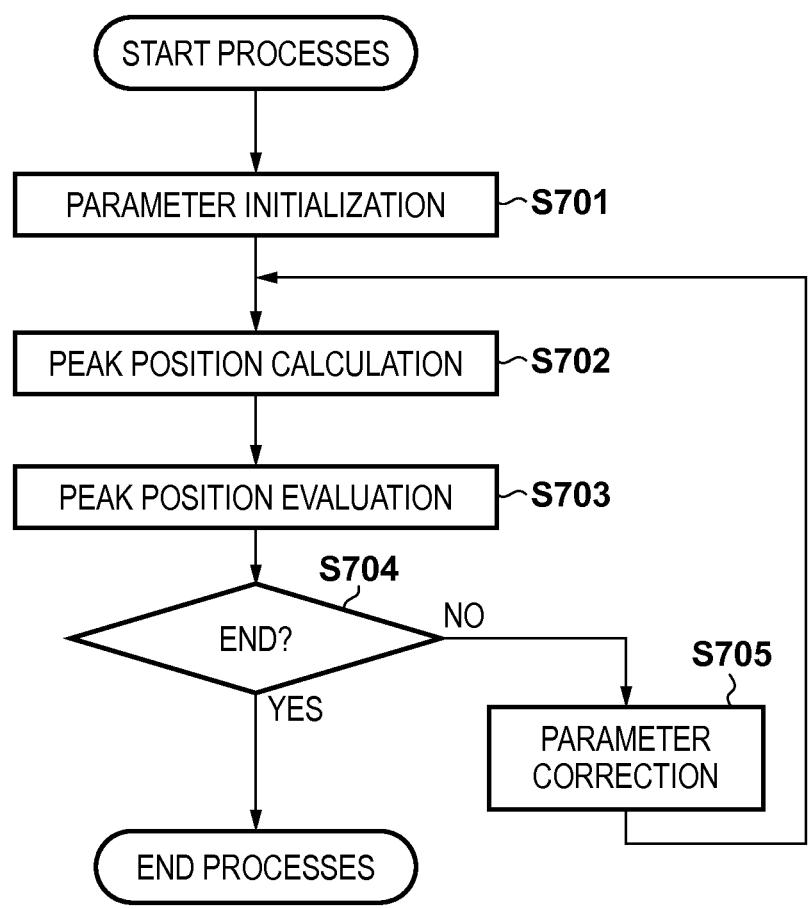
FIG. 7 is a flowchart showing processes of surface position calculation according to the first embodiment.

Next, with reference to the flowchart shown in FIG. 7, a detailed description is given of the method for calculating the three-dimensional coordinates of the surface position in step S404. The surface position calculating unit 208 determines each parameter such that the difference between the image position of the pattern of light in each captured image obtained in step S403 and the image position obtained by a simulation based on the state of scattering of the pattern of light falls within a predetermined threshold range, preferably with respect to all of the plurality of view points. The surface position calculating unit 208 then calculates the three-dimensional coordinates of the surface position on the measurement target object 104 based on the determined parameter set. Note that there are cases where data considered as noise is obtained from some of the view points due to the influence of a disturbance, and it is therefore not necessary that the differences for all the view points fall within the predetermined threshold range. If this is the case, it is only required that the differences for all the view points except for noise data that is considered as an outlier fall within the predetermined threshold range.

First, in step S701, the initialization processes are performed for the above-described five parameters. The following describes an example of the method for obtaining the initial values. First, regarding the three-dimensional position (vector $x_i$), an apparent three-dimensional position is obtained from the light ray direction of the slit light ray corresponding to the peak position in the captured image obtained by one of the image capturing apparatuses 102a to 102e, and the parameter t that can be obtained from this three-dimensional position is set as the initial value. As indicated by the positions 322a to 322e in FIG. 3, three-dimensional positions obtained in such a manner are points that are located deeper than the correct surface position on the measurement target object.

Figure 8:
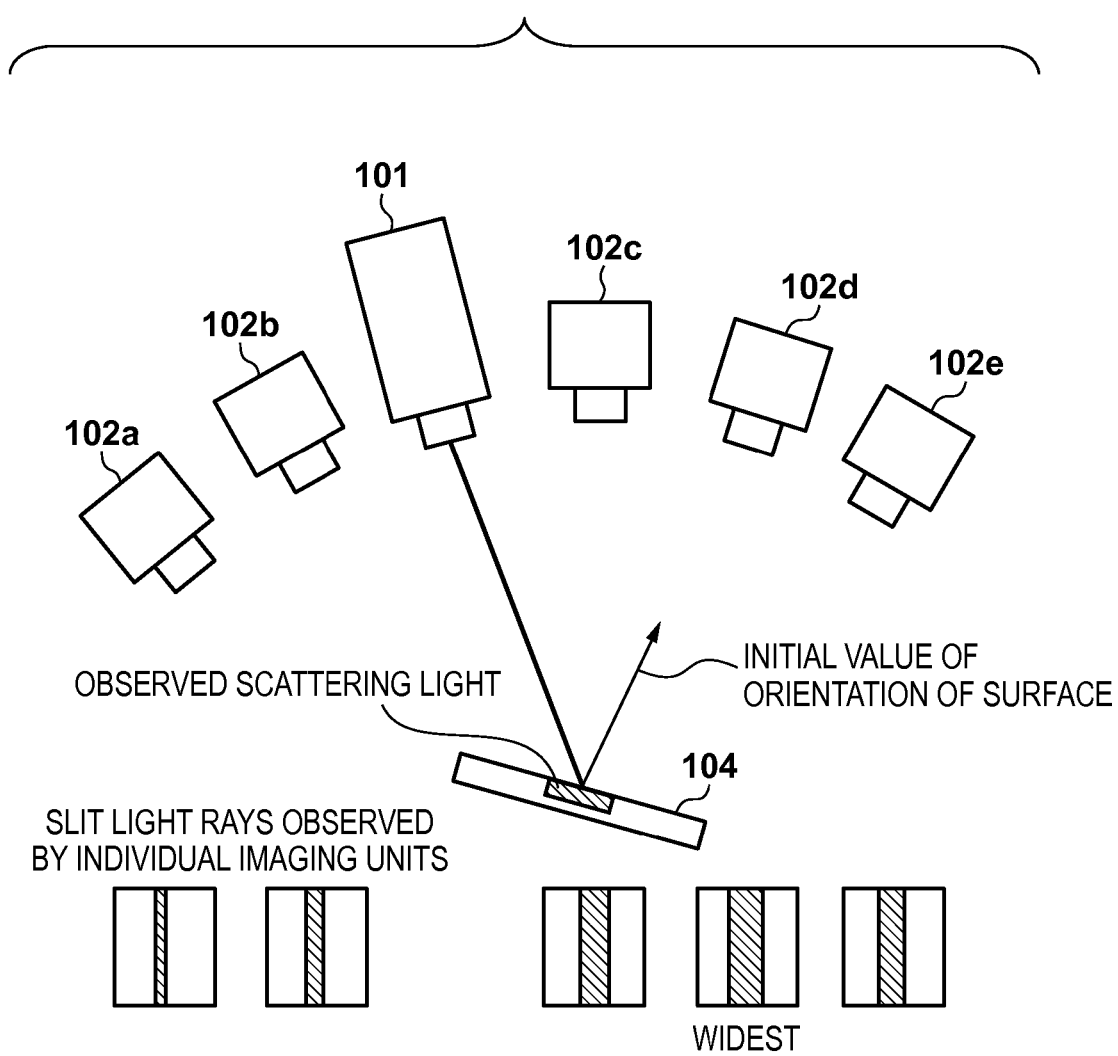
FIG. 8 is a diagram showing how to obtain an initial value of an orientation of a surface according to the first embodiment.

Next, a description is given of the initial values of the parameters p and q, which determine the orientation of the surface. As shown in FIG. 8, a larger apparent irradiated region of the captured image can be considered to indicate that the irradiated region is observed from a direction closer to the front direction. Considering this, the direction in which the image capturing apparatus that observes the widest slit light ray among the slit light rays observed by the image capturing apparatuses 102a to 102e is located is defined as the initial value of the orientation of the surface, and the parameters p and q that determine this orientation of the surface are set as the initial values. In the example shown in FIG. 8, the direction toward the image capturing apparatus 102d is the orientation of the surface.

Regarding the initial values of the anisotropy parameter g and the relative refraction index $\eta$ of the scattering properties, it is known that in the case of plastic for example, the anisotropy parameter g falls within the range of 0.6 to 0.9 and the relative refraction index $\eta$ falls within the range of 1.4 to 1.6. Therefore, appropriate values respectively selected from these ranges are set as the initial values. However, the method for determining the initial values are not limited to the method above. For example, the initial value of the orientation of the surface may be obtained by calculating the apparent three-dimensional coordinates of the surrounding points, performing principal component analysis for these points, and determining the third principle component as the orientation of the surface.

In step S702, the peak position is calculated based on the given parameters. Given the parameters of the three-dimensional position, the orientation of the surface, and the scattering properties, it is possible to figure out where the peak position related to the slit light ray projected from the projection unit 201 can be observed by the image capturing units 202a to 202e, using rendering technology or a physical simulator. In the present embodiment, rendering is performed by the rendering method disclosed in Document 4, and the peak position is calculated for each image obtained by the individual image capturing units, by the same processes as those in step S403.

Next, in step S703, a comparison is made between the peak positions detected in step S403 from the images obtained by the individual image capturing units and the peak positions calculated in step S702 for the individual image capturing units. When the actual peak position in the case where the $i^{th}$ slit light ray is observed by an image capturing unit j is denoted as $P_{ij}^{obs}$, and the peak position obtained by rendering from the given five parameters is denoted as $P_{ij}(t,p,q,g,\eta)$, the parameters are adjusted by Expression 4 below such that the calculated difference between these peak positions is the minimum.

$$|p_{ij}^{obs}-p_{ij}(t,p,q,g,\eta)|<T \qquad \text{Expression 4}$$

It is then determined whether or not the minimum value of the left-hand side of Expression 4 is smaller than a threshold value T with respect to every image capturing unit j.

In step S704, the processes end if the determination in step S703 results in the minimum value for every image capturing unit j except for outliers being smaller than the threshold value T. Otherwise, step S705 is performed next.

In step S705, a correction is made to the five parameters t, p, q, g, and $\eta$. The following method may be used as the correction method, for example. Rendering is performed by infinitesimally changing only one of the parameters, for example the parameter t, while fixing the other four parameters, and the left-hand side of Expression 4 is minimized, where the peak position thus detected is denoted as $P_{ij}(t+\Delta,p,q,g,\eta)$. A corrected value $t_{new}$ for the parameter t in the case of minimization using the Newton method is determined by Expression 5 below.

$$t_{new} = t - \frac{\Delta P_{ij}(t,p,q,g,\eta)}{P_{ij}(t+\Delta,p,q,g,\eta) - P_{ij}(t,p,q,g,\eta)} \qquad \text{Expression 5}$$

Next, the same process as above is performed by infinitesimally changing only the parameter p while fixing the other four parameters. In this way, by repeatedly performing the process by infinitesimally changing only one of the parameters while fixing the other four parameters, the five parameters are corrected until the left-hand side of Expression 4 obtained for each image capturing apparatus becomes smaller than T (until Expression 4 is fulfilled). Note that the correction method is not limited to the method using an image rendered by infinitesimally changing the parameters as described above. For example, in the case where the scattering properties can be represented with a simpler model formula, the peak position may be analytically obtained by representing the peak position as a mathematical expression using parameters as variables.

In this way, the surface position is calculated for the $i^{th}$ slit light ray, and the parameters concerning the orientation of the surface and the scattering properties are also calculated.

As described above, according to the first embodiment, a comparison is made between the peak positions observed by the individual image capturing units using the projection of a slit light ray, and the peak positions calculated by a simulation using, as parameters, the surface position on the measurement target object, the orientation of the surface, and the scattering properties. Obtaining accurate parameters with this comparison makes it possible to obtain an accurate surface position on the measurement target object even when the scattering properties of the measurement target object are unknown. According to the methods disclosed in Document 1 and Document 2 above, it is necessary to prepare a reference object that has the same scattering properties as those of the measurement target object and to preliminarily perform detailed measurement. Therefore, the methods disclosed in Document 1 and Document 2 are not necessarily practical unless they are used for a purpose with which the material of the target object is limited. In contrast, with the three-dimensional measurement apparatus according to the first embodiment, it is not required to perform measurement in advance using a reference object that has the same scattering properties as those of the measurement target object, and more accurate three-dimensional measurement can be realized regardless of the shape, the geometric arrangement, or the amount of direct reflection light component of the measurement target object. Furthermore, the parameters of the orientation of the surface and the scattering properties can be obtained. Note that the present embodiment is particularly effective for measurement target objects made of translucent material with which only a small amount of reflection light component occurs and which is greatly influenced by internal scattering.

Second Embodiment

In the second embodiment, taking advantage of the fact that information concerning the scattering properties of the measurement target object is known in advance, three parameters t, p, q concerning the shape, among the parameters described in the first embodiment, are subjected to adjustment. Consequently, the number of required image capturing apparatuses (view points) is smaller than that for measurement according to the first embodiment, and three-dimensional measurement is more reliably performed with a smaller amount of calculation. The following describes the second embodiment in detail, mainly with respect to differences from the first embodiment.

An example of the configuration of the three-dimensional measurement apparatus 100 according to the second embodiment is similar to the configuration shown in FIG. 1 (the first embodiment). However, since the number of required image capturing apparatuses in the second embodiment is three, the image capturing apparatuses 102a to 102c are used, and the other image capturing apparatuses may be omitted.

Figure 9:
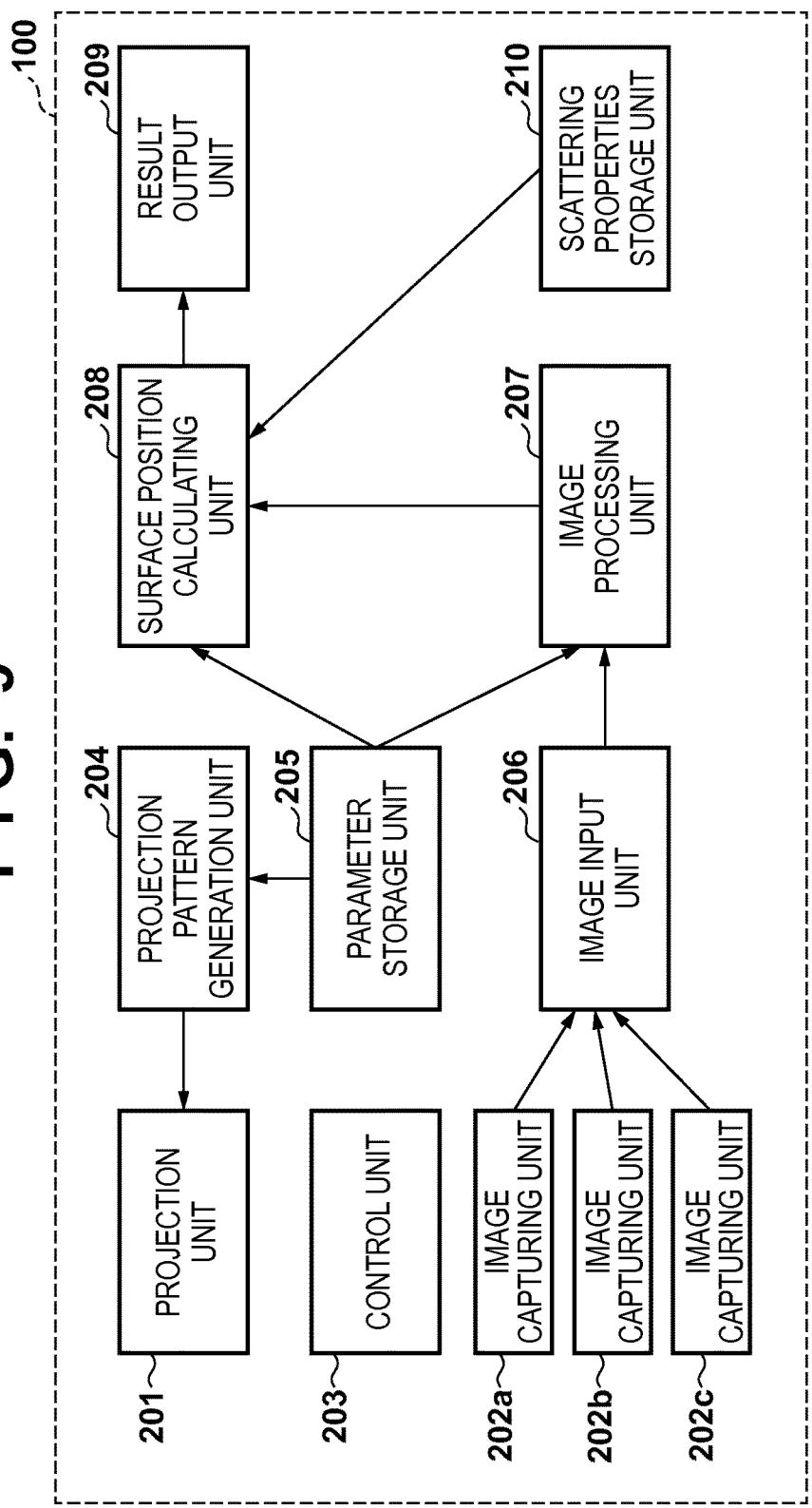
FIG. 9 is a functional block diagram of a three-dimensional measurement apparatus according to a second embodiment.

FIG. 9 is a functional block diagram of the three-dimensional measurement apparatus according to the second embodiment. When compared with FIG. 2, which is the block diagram for the first embodiment, it can be seen that a scattering properties storage unit 210 has been added. Considering the above, the description of the same parts are omitted, and a description is given of the scattering properties storage unit 210 which constitutes the difference.

The scattering properties storage unit 210 stores information concerning the scattering properties of the measurement target object 104, and is used for defining the actions of reflecting and scattering light when performing a simulation and calculating the peak position by using the surface position calculating unit 208. Information concerning the scattering properties mentioned above is the values of two parameters, namely the anisotropy parameter g and the relative refraction index η for the scattering properties model used in the first embodiment. Alternatively, the scattering properties storage unit 210 may retain a table in which the anisotropy parameter g and the relative refraction index η for the scattering properties model is recorded for each of the materials of measurement target objects so that the user can select the parameters according to the material of the measurement target object. Information concerning the scattering properties is not limited to the example above, and data obtained by, for example, observing the peak position using a reference object that has the same scattering properties as those of the measurement target object while changing the orientation may be preliminarily retained as a table. The functions of the scattering properties storage unit 210 are realized by the control apparatus 103. Also, a configuration may be adopted in which, in the case where information concerning the scattering properties that match those of the material of the measurement target object is not retained in the scattering properties storage unit 210, the processes to be performed are switched so as to adjust the five parameters by using the captured images from the five view points in the same manner as that in the first embodiment.

The flow of the three-dimensional measurement processes in the second embodiment is the same as that in the first embodiment (FIG. 4). The processes of surface position calculation are the same as those in the first embodiment (FIG. 7). However, since the number of parameters is smaller than that in the first embodiment, the following describes the processes performed in step S701 and step S705.

The initialization processes in step S701 are performed to initialize three parameters in total, namely the parameter t denoting the three-dimensional position and the parameters p and q denoting the orientation of the surface. The method for initializing these parameters are the same as that described above for the first embodiment. The scattering properties of the measurement target object 104 are set by reading the known scattering properties parameters (g, η) of the measurement target object 104 from the scattering properties storage unit 210. Parameter correction in step S705 is performed to correct the three parameters (t, p, q) of the three-dimensional position and the orientation of the surface. The method for correction is the same as that in the first embodiment. Only one parameter is infinitesimally changed while fixing the other two parameters, and the process is repeated to correct the three parameters until Expression 4 is fulfilled.

As described above, according to the second embodiment, the scattering properties are known, and parameters other than the scattering properties parameters in the parameter set are adjusted. Consequently, the number of image capturing apparatuses (the number of view points) can be reduced to three, and three-dimensional measurement can be reliably performed at high speed. Alternatively, when the number of image capturing apparatuses (the number of view points) is greater than three, constraint conditions can be increased at the time when peak position evaluation in step S703 is performed, and accordingly the parameters can be more reliably obtained.

Third Embodiment

In the third embodiment, when measuring the three-dimensional shape of the measurement target object, the processes are changed according to the material by determining the presence or absence of subsurface scattering. Consequently, it is possible to realize accurate measurement of the three-dimensional shape even when the measurement target object includes both a translucent body and an opaque body. The following describes the third embodiment in detail, mainly with respect to differences from the first embodiment.

Figure 10:
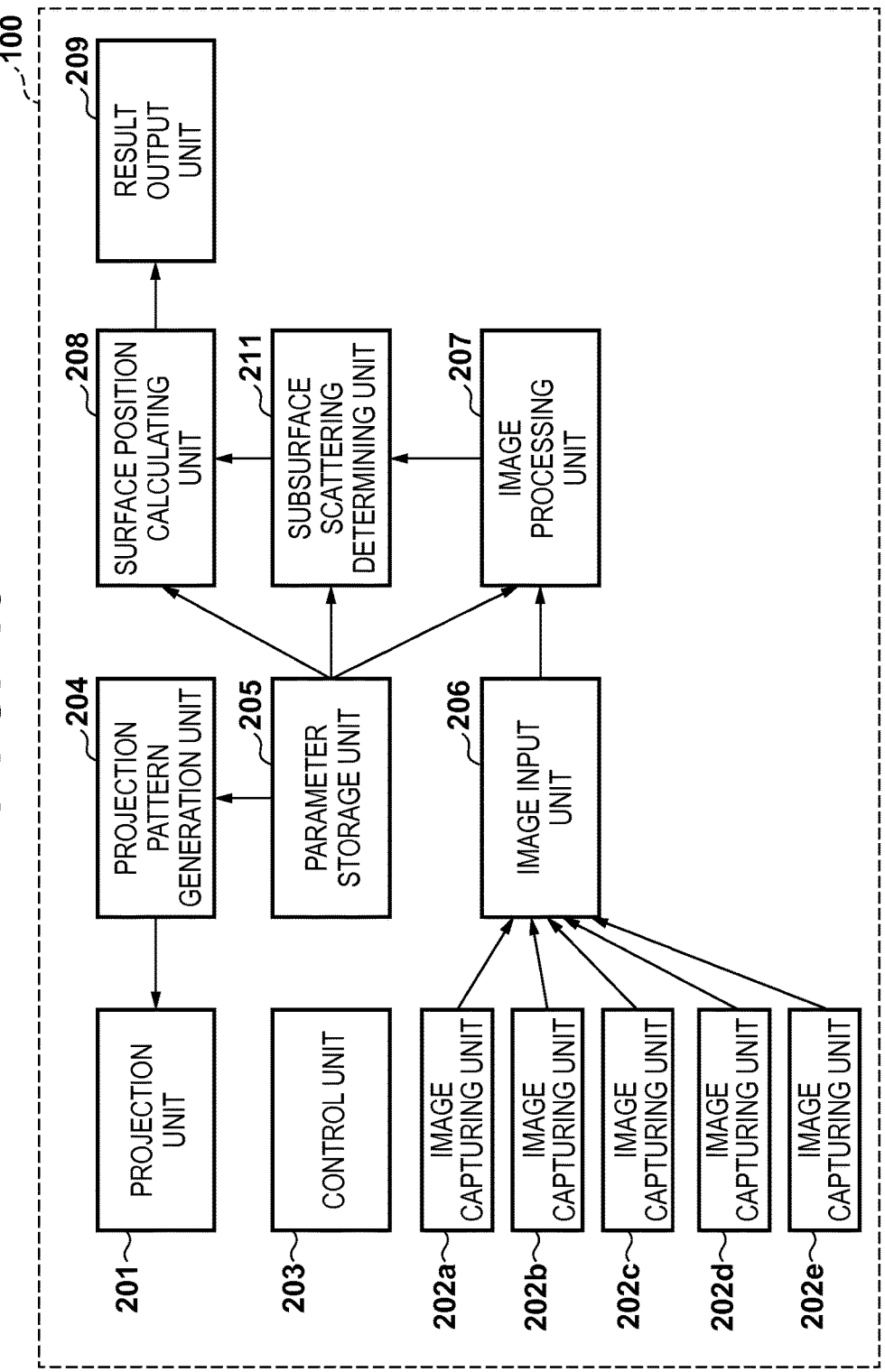
FIG. 10 is a functional block diagram of a three-dimensional measurement apparatus according to a third embodiment.

An example of the configuration of the three-dimensional measurement apparatus 100 according to the third embodiment is similar to the configuration of the first embodiment (FIG. 1). FIG. 10 is a functional block diagram of the three-dimensional measurement apparatus 100 according to the third embodiment. When compared with the functional configuration according to the first embodiment (FIG. 2), a difference lies in that a subsurface scattering determining unit 211 has been added.

The subsurface scattering determining unit 211 obtains a pair of the projection direction and the image peak position from the image processing unit 207, and obtains the individual calibration data sets for the projection apparatus 101 and the image capturing apparatuses 102a to 102e from the parameter storage unit 205. The subsurface scattering determining unit 211 then determines the presence or absence of subsurface scattering at the measurement point of interest, and transmits the determination result to the surface position calculating unit 208. The specific details of this process will be described later with reference to a flowchart. Note that the functions of the subsurface scattering determining unit 211 are realized by the control apparatus 103.

Figure 11:
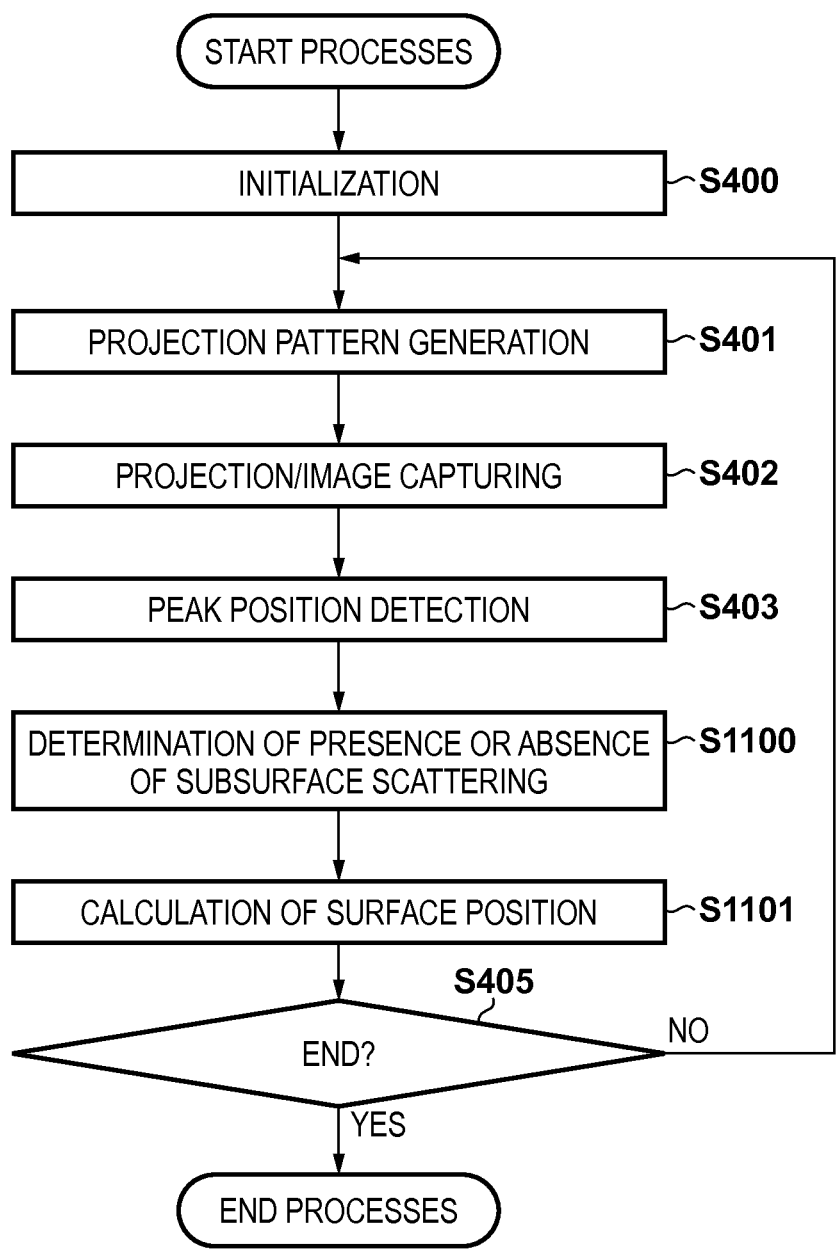
FIG. 11 is a flowchart showing a flow of processes according to the third embodiment.

FIG. 11 is a flowchart showing the flow of the processes performed by the three-dimensional measurement apparatus according to the third embodiment. In FIG. 11, the same processes as those in the first embodiment are given the same step numbers as those in FIG. 4. In the third embodiment, the processes in steps S1100 and S1101 are performed instead of the process in step S404 shown in FIG. 4. The following provides a detailed description of steps S1100 and S1101 (processes of determining the presence or absence of subsurface scattering and switching the measurement method).

In step S1100, the subsurface scattering determining unit 211 determines the presence or absence of subsurface scattering by using the peak position of each image capturing unit detected in step S403. More specifically, the subsurface scattering determining unit 211 receives the individual calibration data sets for the projection unit 201 and the image capturing units 202a to 202e from the parameter storage unit 205, and represents, in the same coordinate system, the respective peak positions in the captured images obtained by the individual image capturing units using the calibration data sets, and compares the peak positions with each other. At this time, if the differences between the respective peak positions of the image capturing units are smaller than or equal to a threshold value specified by the user or a predetermined threshold value, it is deemed that the peak positions coincide with each other and thus determined that subsurface scattering is absent. This is because the peak positions coinciding with each other indicate that each image capturing unit is observing the direct reflection light reflected off the surface position on the measurement target object 104. On the other hand, if any of the differences between the peak positions is greater than the threshold value, it is deemed that the corresponding peak positions are displaced by the influence of subsurface scattering, and thus subsurface scattering is present.

Figure 12:
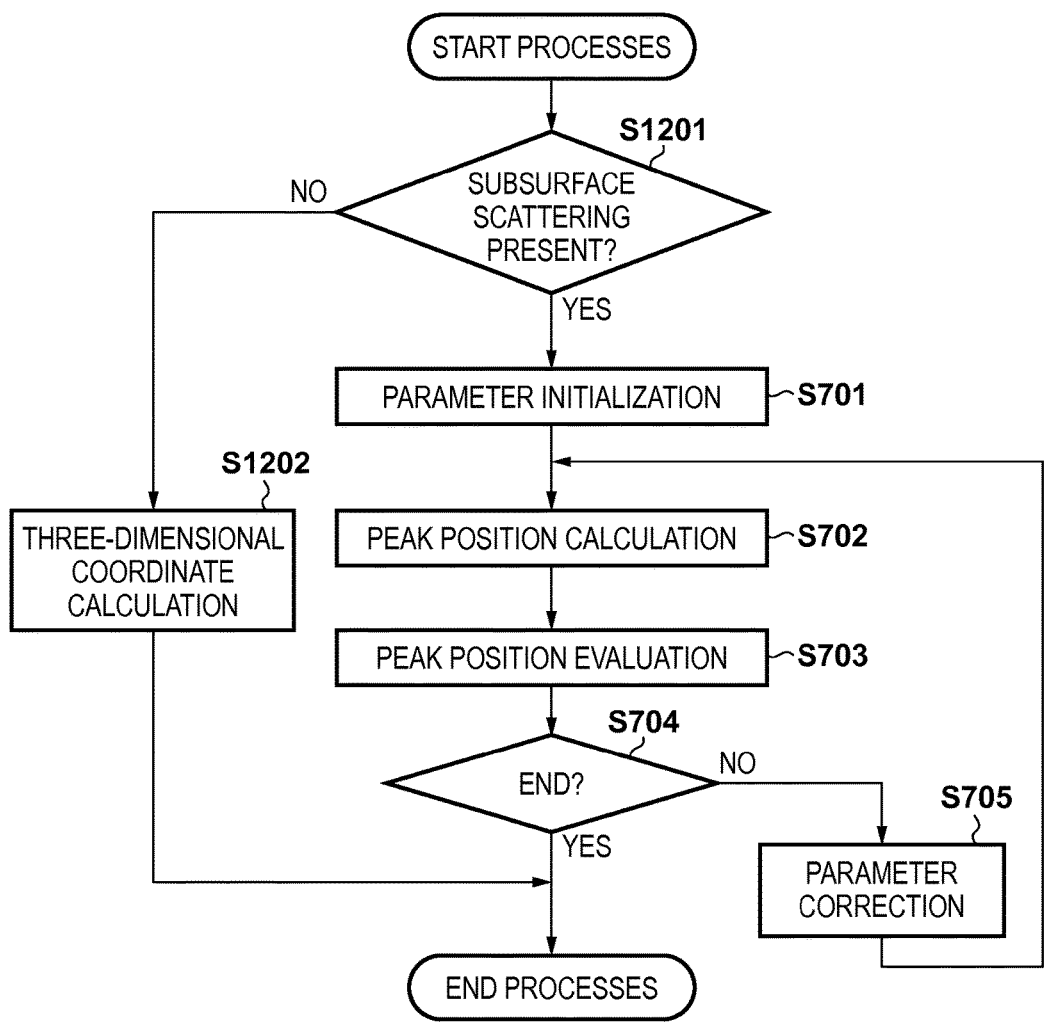
FIG. 12 is a flowchart showing processes of surface position calculation according to the third embodiment.

In surface position calculation in the subsequent step S1101, the processes to be performed are changed according to the presence or absence of subsurface scattering. FIG. 12 is a flowchart showing processes of surface position calculation (step S1101) according to the third embodiment. First, in step S1201, the flow of processes branches according to the presence or absence of subsurface scattering determined in step S1101. In the case where subsurface scattering is present, step S701 is performed next, and the processes described for the first embodiment (steps S701 to S705 in FIG. 7) are performed. On the other hand, in the case where it is determined in step S1100 that subsurface scattering is absent, step S1202 is performed after step S1201. In step S1202, the surface position calculating unit 208 obtains the three-dimensional coordinates by triangulation based on the peak positions, and sets the three-dimensional coordinates as those of the surface position. In other words, the three-dimensional coordinates of the surface position on the measurement target object are calculated based on at least some of the plurality of captured images. As the method for calculating the three-dimensional coordinates using at least some of the plurality of captured images, the following methods may be used, for example:

a method using the image capturing apparatus that is closest to the projection apparatus;

a method using the image capturing apparatus that is located in a direction that is the closest approximation to the regular reflection direction of the slit light ray from the projection apparatus; and a method using the peak position with the highest luminance among the peak positions that can be obtained from the plurality of captured images.

Alternatively, the average of the plurality of peak positions that can be obtained from the plurality of captured images may be used.

As described above, according to the third embodiment, the surface position is calculated by different procedures according to the presence or absence of subsurface scattering. According to the third embodiment, with respect to a measurement target object that includes a translucent body and an opaque body, and a measurement target object that has not been identified in advance as being composed of a translucent body or an opaque body, the processes to be performed can be adaptively changed according to the scattering properties (the presence or absence of subsurface scattering). Therefore, more accurate three-dimensional measurement can be realized. The third embodiment described above has the configuration of the first embodiment to which the subsurface scattering determining unit 211 has been added. However, it is a matter of course that the third embodiment may have the configuration of the second embodiment to which the subsurface scattering determining unit 211 has been added.

Fourth Embodiment

A three-dimensional measurement apparatus according to the fourth embodiment projects a pattern of spot light rays or slit light rays from a plurality of laser light sources, observes the situation from a single camera, and obtains the correspondence relationship between the directions of the light rays projected from the light sources and the camera image position. Then, the three-dimensional measurement apparatus determines a parameter set, which includes parameters concerning the observation position on the surface of the measurement target object, the orientation of the surface, and the scattering properties, based on the correspondence relationship obtained from the plurality of projection directions, and the three-dimensional measurement apparatus thus realizes measurement of the three-dimensional coordinates, i.e., the three-dimensional shape, of the surface of the measurement target object.

Figure 14:
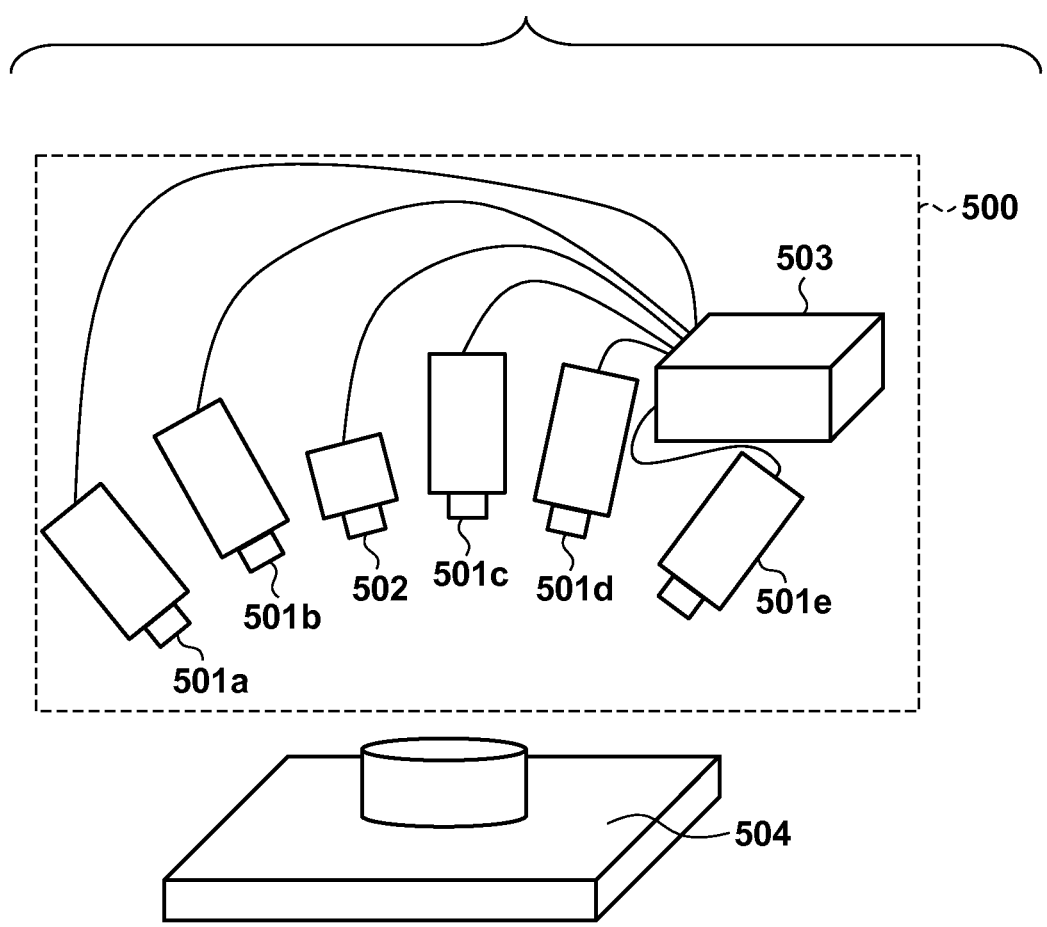
FIG. 14 is a diagram showing an example of a configuration of a three-dimensional measurement apparatus according to a fourth embodiment.

FIG. 14 is a diagram showing an example of the configuration of the three-dimensional measurement apparatus according to the fourth embodiment. A reference numeral 500 denotes the three-dimensional measurement apparatus, which measures the three-dimensional shape of the measurement target object. Reference numerals 501a to 501e denote projection apparatuses, a reference numeral 502 denotes an image capturing apparatus, a reference numeral 503 denotes a control apparatus, and a reference numeral 504 denotes a measurement target object. In the three-dimensional measurement apparatus 500 having such a configuration, the projection apparatuses 501a to 501e project patterns of light, which are described below, onto the measurement target object 504. The patterns of light are reflected off the surface of the measurement target object 504 or scatter inside the measurement target object 504, and are subjected to image capturing performed by the image capturing apparatus 502. The position and orientation of the image capturing apparatus 502 relative to each of the projection apparatuses 501a to 501e are known. The image captured by the image capturing apparatus 502 (captured image) is transmitted to the control apparatus 503. Using a computer and electrical circuitry provided inside, the control apparatus 503 controls the operations of the projection apparatuses 501a to 501e and the image capturing apparatus 502.

Figure 15:
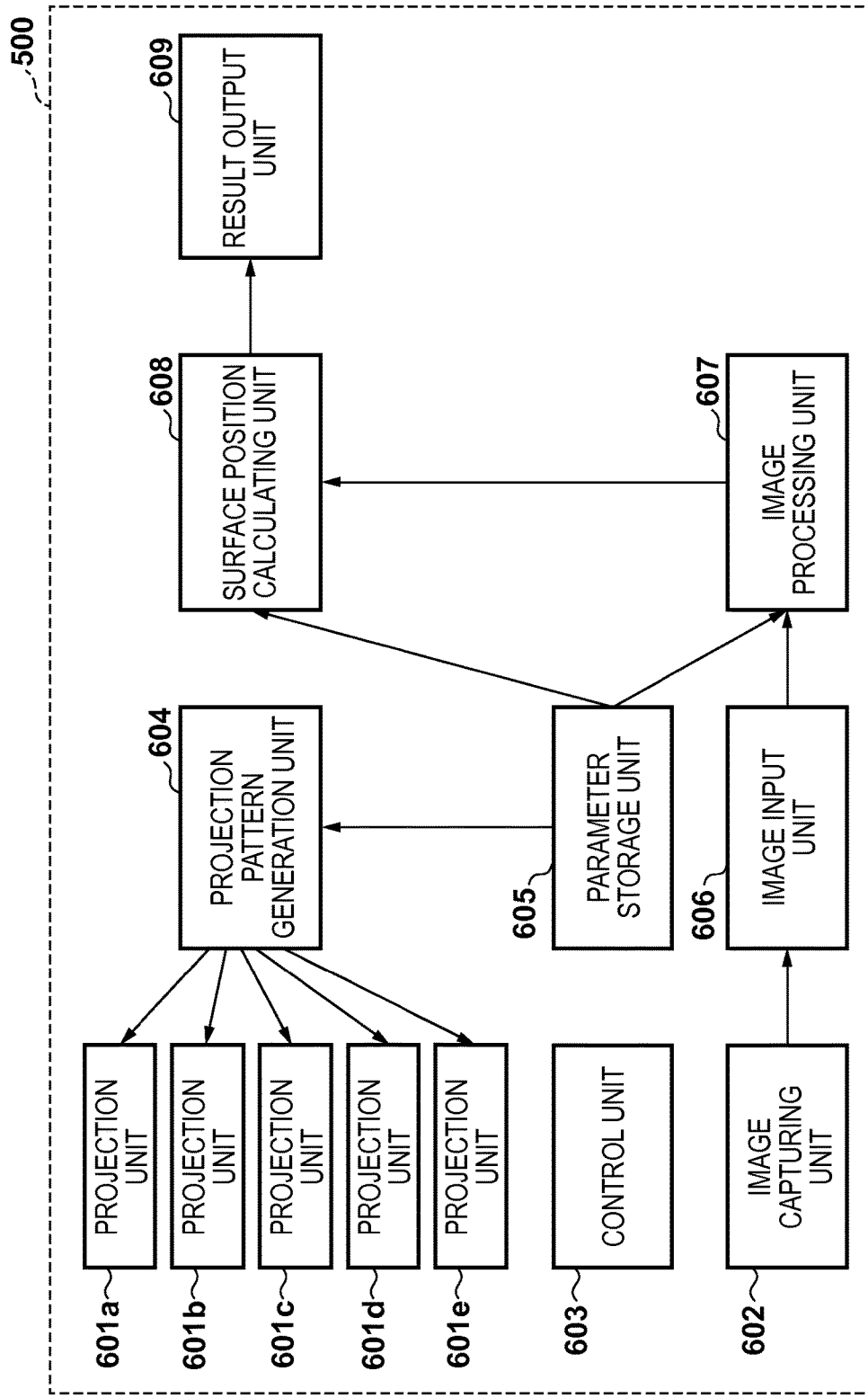
FIG. 15 is a functional block diagram of the three-dimensional measurement apparatus according to the fourth embodiment.

FIG. 15 is a functional block diagram showing an example of the functional configuration of the three-dimensional measurement apparatus 500 according to the fourth embodiment. Projection units 601a to 601e drive the projection apparatuses 501a to 501e to project patterns of light, which have been generated by a projection pattern generation unit 604, onto a measurement area including the measurement target object 504. Note that projection is controlled by the projection units 601a to 601e receiving a projection control signal, which is transmitted from a control unit 603. The functions of the projection units 601a to 601e are realized by the projection apparatuses 501a to 501e. Note that the projection control signals to be transmitted to the projection units 601a to 601e are not necessarily synchronous for all the projection units. It suffices if, within the measurement range to be subjected to image capturing by an image capturing unit 602, each of the projection units 601a to 601e can scan the range onto which a pattern of light can be projected, and the image capturing apparatus can capture an image of the situation in which scanning with a pattern of light is performed.

The image capturing unit 602 realizes an image capturing function, which is the function of obtaining a captured image by capturing an image of the measurement area, which includes the measurement target object 504, from a certain view point. For example, the image capturing unit 602 receives an image capturing control signal, which is transmitted from the control unit 603, and captures an image of the measurement area by driving the image capturing apparatus 502 according to the timing of receiving the image capturing control signal such that the shutter speed, the aperture, and the focal position that have been specified in advance are achieved. The image captured by the image capturing apparatus 502 is transmitted to an image input unit 606 via the image capturing unit 602. The functions of the image capturing unit 602 are realized by the image capturing apparatus 502.

In the present embodiment, five projection directions are illustrated as the plurality of projection directions and a description is given on the assumption that there are five projection apparatuses. However, the number is not limited to five. Also, it is not always required that the number of projection apparatuses corresponds to the number of projection directions, and projection from a plurality of projection directions may be achieved by attaching a single projection apparatus to the tip of a robot hand for example, and moving the projection apparatus while controlling the position and orientation thereof. Alternatively, the same results as multi-directional projection may be obtained by fixing the positions of the measurement target object 504 and the image capturing unit 602 relative to each other and moving the measurement target object by using a rotary table or the like.

The projection pattern generation unit 604 generates a pattern that is required for obtaining the correspondence relationship between a position on the image captured by the image capturing unit 602 and the direction of the light ray projected by the projection units 601a to 601e. The following provides a description of the present embodiment on the assumption that scanning and projection is performed with spot light. However, the pattern of light is not limited to such a pattern of spot light, and any well-known pattern of light available for three-dimensional measurement, such as a pattern of structured light, slit light, or a space partitioning image like a gray code may be used. Also, the respective patterns for the projection units 601a to 601e generated by the projection pattern generation unit 604 are patterns that can be separated from each other after image capturing. For example, patterns of light each having a different wavelength are respectively used for the five projection units 601a to 601e so that the patterns of light from the projection units 601a to 601e can be separated from each other. In this case, the patterns of light from the projection units 601a to 601e may be separated according to their colors in the captured images, or separated by switching the wavelength band that a bandpass filter provided in front of the image capturing unit 602 allows to pass through. Also, it is possible to sequentially project the patterns of light by varying the timing of projection for each of the projection units 601a to 601e, and separate the patterns of light to eliminate the mutual influence of the patterns of light.

A parameter storage unit 605 retains various kinds of parameters that are required for performing three-dimensional measurement. The parameters include, for example, settings and calibration data sets for controlling the projection units 601a to 601e and the image capturing unit 602. Note that the functions of the parameter storage unit 605 are realized by the control apparatus 503. The image input unit 606 receives an image captured by the image capturing unit 602, and retains the image in a memory area, which is not shown in the drawings. Note that the image capturing unit 602 performs image capturing and scanning from different projection directions, and captures a plurality of images of the measurement target object 504 irradiated with spot light. The image input unit 606 sequentially receives input captured images from the image capturing unit 602, and adds the captured images to the memory area. The image input unit 606 outputs the captured images retained in the memory area to an image processing unit 607. The functions of the image input unit 606 can be realized by the control apparatus 503.

The image processing unit 607 receives, from the image input unit 606, the captured images obtained by the image capturing unit 602, and by performing the required image processing, obtains the image positions of the patterns of light projected onto the measurement target object 504 according to the respective scanning patterns in the plurality of projection directions. Image processing performed by the image processing unit 607 includes mainly separation of the influence from each projection direction, detection of peak positions on the captured images corresponding to the directions of the spot light rays, the process of smoothing the captured images, which is performed to make it easy to detect the peak positions, and so on. The functions of the image processing unit 607 are realized by the control apparatus 503. A surface position calculating unit 608 receives, for each projection direction, a pair of the scanning position of the corresponding spot light ray and the corresponding image peak position from the image processing unit 607, and receives the individual calibration data sets for the projection units 601a to 601e and the image capturing unit 602 from the parameter storage unit 605. The surface position calculating unit 608 then calculates accurate three-dimensional coordinates of the measurement target object 504 based on the pieces of information mentioned above, and transmits the three-dimensional coordinates to a result output unit 609.

The result output unit 609 outputs the three-dimensional coordinates of the measurement target object 504 calculated by the surface position calculating unit 608. The output destinations include, for example, a display apparatus, another computer, and an auxiliary storage apparatus, which are connected to the control apparatus 503. In the present embodiment, the functions of the result output unit 609 are realized by the control apparatus 503.

The surface position calculating unit 608 according to the fourth embodiment calculates the three-dimensional coordinates of the surface of the measurement target object 504 by:

obtaining the image positions of the patterns of light by, for example, performing a simulation based on the parameter set including the parameters concerning the scattering properties of the measurement target object 504 and the surface position on the measurement target object 504; and adjusting each parameter based on the image positions (the peak positions in the present embodiment) of the patterns of light obtained by the image processing unit 607 and the image positions of the patterns of light obtained based on the parameter set, and determining the parameter set.

More specifically, the surface position calculating unit 608 carries out the processes of:

obtaining the image positions (the peak positions) of the patterns of light that are projected from the respective projection directions based on the state of scattering of the patterns of light obtained based on the individual parameters included in the parameter set;

adjusting the parameters constituting the parameter set based on the image positions obtained from the captured images and the image positions obtained based on the state of scattering, and determining the parameter set; and calculating the three-dimensional coordinates based on the surface position included in the parameter set thus determined. Here, the image positions based on the state of scattering can be obtained by, for example, obtaining the image positions (the peak positions in the present embodiment) of the patterns of light from images obtained by rendering the state of scattering according to the parameter set. The following provides a description of a phenomenon caused by reflection near the surface of the measurement target object 504 or subsurface scattering, which occur at the time of measurement, and of the principle by which the surface position calculating unit 608 determines (renders) the state of scattering of the patterns of light based on the phenomenon and obtains the surface position (three-dimensional coordinates) of the measurement target object 504.

Figure 16:
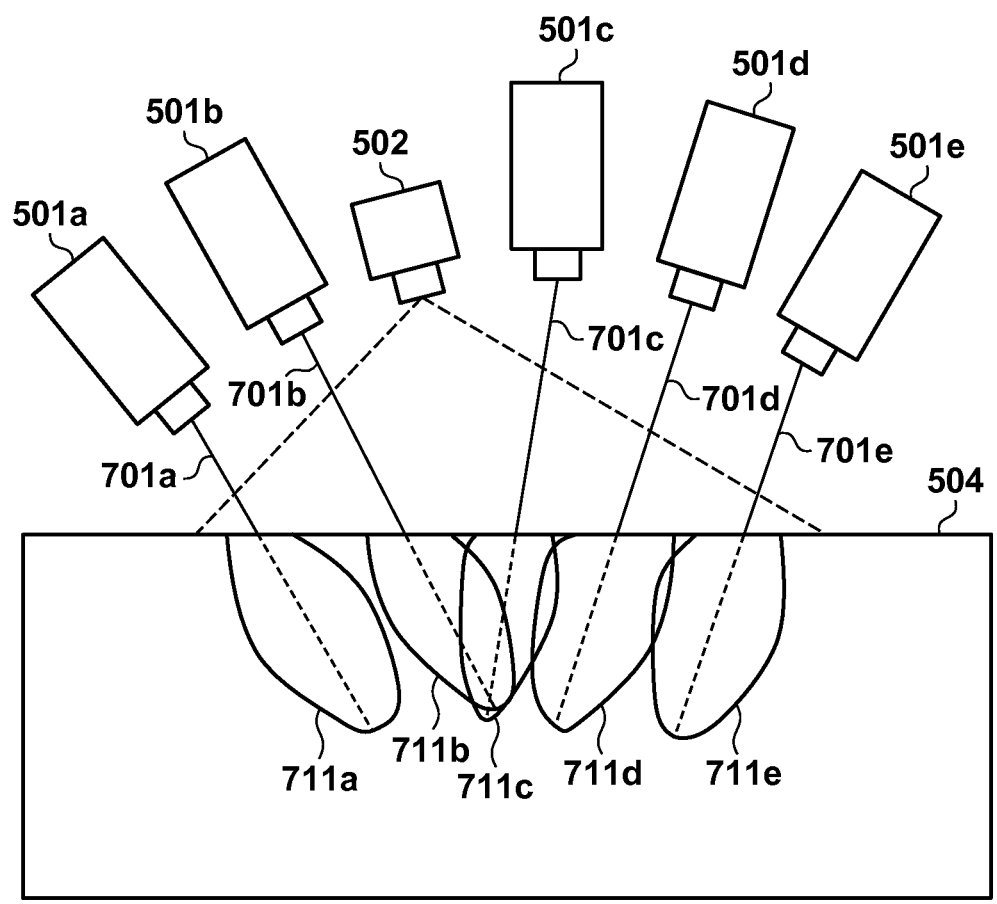
FIG. 16 is a diagram illustrating a subsurface scattering phenomenon according to the fourth embodiment.

FIG. 16 shows the subsurface scattering phenomenon occurring in the measurement target object 504 due to the plurality of projection light rays. First, with reference to FIG. 16, a description is given of how the measurement target object 504, onto which projection light rays are projected from the projection apparatuses 501a to 501e, is observed by the image capturing apparatus 502. As described in the first embodiment, of each of spot light rays 701a to 701e respectively projected from the projection apparatuses 501a to 501e onto the measurement target object 504, a portion is reflected off the surface of the object as reflection light and another portion enters the inside of the object and scatters. The portion of light that has entered the inside of the object is repeatedly reflected in a complicated manner while colliding against media or the like in the substance, and is observed as scattering light. Therefore, a difference in the scattering properties results in a difference in the distribution of areas that appear bright and a difference in the degree of scattering in an anisotropic or isotropic manner relative to the traveling direction of light. Reference numerals 711a to 711e denote lobe-shaped areas that are observed to be bright due to scattering inside the object that is translucent. In the present embodiment, it is assumed that the mutual influence of the patterns of light from the individual projection apparatuses can be separated from each other according to the methods described above. Next, a description is given of the correspondence relationship between the directions of the spot light rays projected from the individual projection apparatuses and the peak position detected by the image capturing apparatus after the mutual influence of the patterns of light from the projection apparatuses have been separated.

FIG. 17 is a diagram showing peak positions that can be seen from the image capturing apparatus 502 when scanning is performed with a spot light ray from the projection apparatus 501a. Reference numerals 711a1 to 711a3 denote lobe-shaped areas that are observed to be bright due to scattering inside the measurement target object 504, in relation to light ray directions 701a1 to 701a3 when scanning is sequentially performed with spot light rays from the projection apparatus 501a. Reference numerals 7021 to 7023 denote image capturing light ray directions to the peak positions that are observed from the image capturing apparatus 502 as the brightest positions corresponding to the light ray directions 701a1 to 701a3. Reference numerals 721a1 to 721a3 denote apparent depth positions that are derived from the light ray directions of the spot light rays and the directions in which the peaks are observed, and these positions are observed as different positions from the correct depth positions shown below. In contrast with the image capturing light ray directions 7021 to 7023, reference numerals 731a1 to 731a3 denote the positions that are to be observed as the correct depth positions In this way, the surface position calculating unit 608 obtains the correspondence relationship between the light ray directions 701a1 to 701a3 of the light rays projected from the projection apparatus 501a and the image capturing light ray directions 7021 to 7023 in which the apparent peak positions are observed from the image capturing apparatus 502. The same is performed on the plurality of projection apparatuses 501a to 501e, and using their respective correspondence relationships, the correct depth positions are obtained and thus three-dimensional measurement is performed.

Next, a description is given of the principle by which the surface position on the measurement target object 504 is obtained from the apparent peak position that is observed in the image capturing light ray direction due to the influence of subsurface scattering.

Here, a consideration is given of the light ray direction with which the peak position is detected at the pixel in a certain pixel direction (the pixel of interest) of the image capturing apparatus 502. The light ray direction with which the peak position is detected at the pixel of interest due to the spot light ray projected from each of the projection apparatuses 501a to 501e is determined depending on the position on the surface of the measurement target object 504, the orientation of the surface in the direction of the pixel of interest and the scattering properties. Conversely, the peak positions that will be observed with respect to the light ray directions of the spot light rays individually projected from the projection apparatuses 501a to 501e can be obtained by reproducing scattering light based on the position on the surface of the measurement target object 504, the orientation of the surface, and the scattering properties, which are provided as variables. To reproduce scattering light, rendering or a physical simulator used in CG may be employed. The following provides a consideration of reproduction of scattering light as described above with spot light rays having the same light ray directions as when the peak is detected at the pixel of interest of the captured image with respect to each of the different projection directions. In this case, given correct variables, the peak positions that can be obtained by reproduction of scattering light should be the same as the peak positions at the pixels of interest that will be actually observed (the peak positions that will be obtained from the captured images). The variables at the time the peak positions are the same correctly represent the position on the surface of the measurement target object. It is thus possible to obtain the three-dimensional shape of the surface of the object by obtaining the variables (parameters) such that the peak positions that are reproduced are the same as the peak positions that will be actually observed with respect to each pixel of the captured images. Furthermore, it is possible to obtain the orientation of the surface and the scattering properties by using the variables that can be obtained at the same time. How to obtain the orientation of the surface and the scattering properties is described below with reference to the flowcharts shown in FIG. 18 and FIG. 21.

Figure 18:
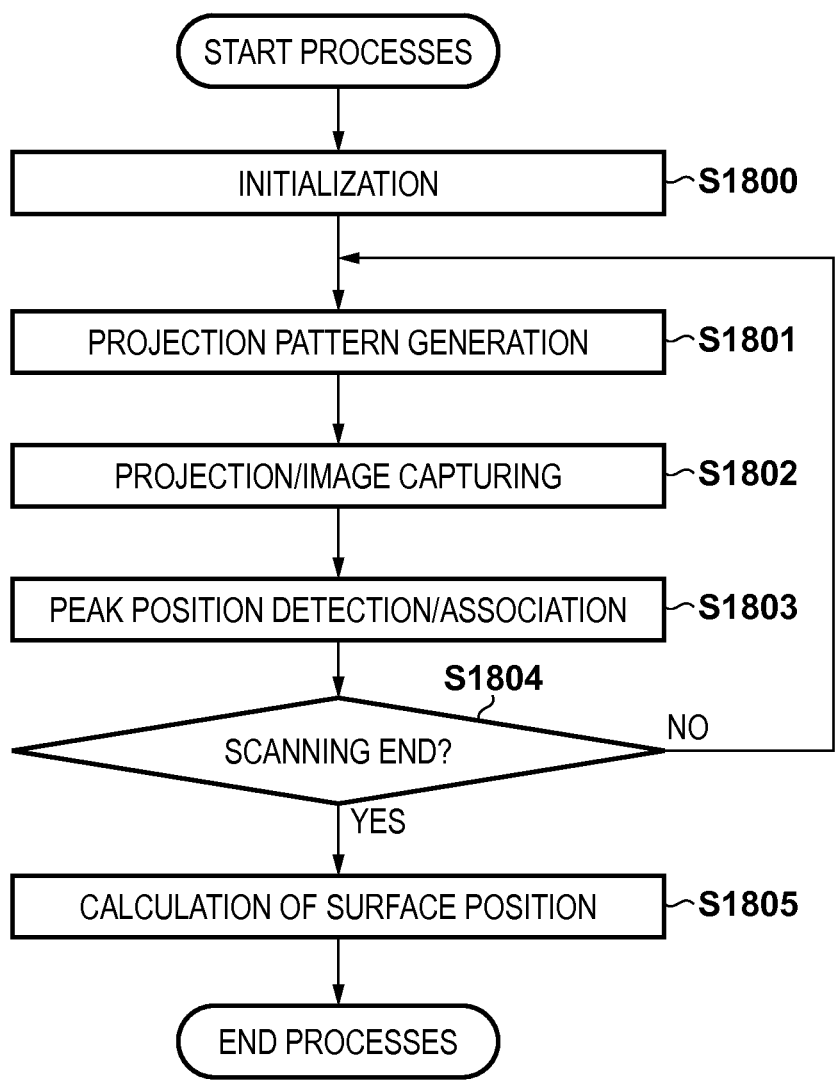
FIG. 18 is a flowchart showing a flow of processes according to the fourth embodiment.

Next, with reference to FIG. 18, a description is given of the flow of three-dimensional measurement processes performed by the three-dimensional measurement apparatus 500 having the configuration above. First, when the apparatus is activated, initialization processes are performed in step S1800. The initialization processes in step S1800 include, for example, the process of activating the projection units 601a to 601e and the image capturing unit 602, and the process of reading various kinds of parameters including the calibration data sets for the projection units 601a to 601e and the image capturing unit 602 and storing them to the parameter storage unit 605.

In step S1801, the projection pattern generation unit 604 determines the direction in which the spot light ray is projected (light ray direction) for each of the projection units 601a to 601e, and transmits the corresponding projection pattern to each of the projection units 601a to 601e. In step S1802, each of the projection units 601a to 601e projects the spot light ray onto the measurement target object 504. The image capturing unit 602 captures images of the measurement target object 504 onto which the spot light rays are projected, and the image input unit 606 retains the images obtained by image capturing as captured images. In step S1803, the image processing unit 607 detects the peak position for each of the different projection directions from the images captured by the image capturing unit 602 using the spot light rays projected onto the measurement target object 504 (i.e., the captured images retained by the image input unit 606). In the present embodiment, the peak position is detected for each of the respective projection directions of the projection units 601a to 601e. Then the correspondence relationship between the light ray directions of the spot light rays and the detected peak positions is obtained. To separate the respective projection patterns for the different projection directions from each other, as described above, the difference in the wavelengths of the spot light rays to be projected may be used. Also, it is possible to capture images while varying the timing of projection for each of the projection units 601a to 601e so that a captured image can be obtained for each of the different projection directions in advance.

Regarding the method for detecting the peak positions, the method for detecting the peak positions with respect to slit light rays has been described above with reference to FIGS. 5A to 5C for the first embodiment. Since the same processes can be employed to detect the peak positions for spot light rays, the description thereof is omitted.

Returning to FIG. 18, in step S1804, it is determined whether or not scanning with spot light rays that can be projected from the individual projection units 601a to 601e onto the measurement target object 504 has ended, and when it has ended, step S1805 is performed next. When there is any region that has not been scanned, the processes above are repeated from step S1801 again.

In step S1805, the surface position calculating unit 608 first determines any of the projection units 601a to 601e that have the same detected peak positions and their light ray directions, based on the correspondence relationship between the light ray directions of the spot light rays and the detected peak positions. The surface position calculating unit 608 then calculates the three-dimensional coordinates of the surface position from the corresponding pairs of a projection unit, among the projection units 601a to 601e, and its light ray direction, based on the scattering properties of the measurement target object 504. The method for calculating the three-dimensional coordinates will be described later in detail with reference to FIG. 20 and FIG. 21.

Figure 19:
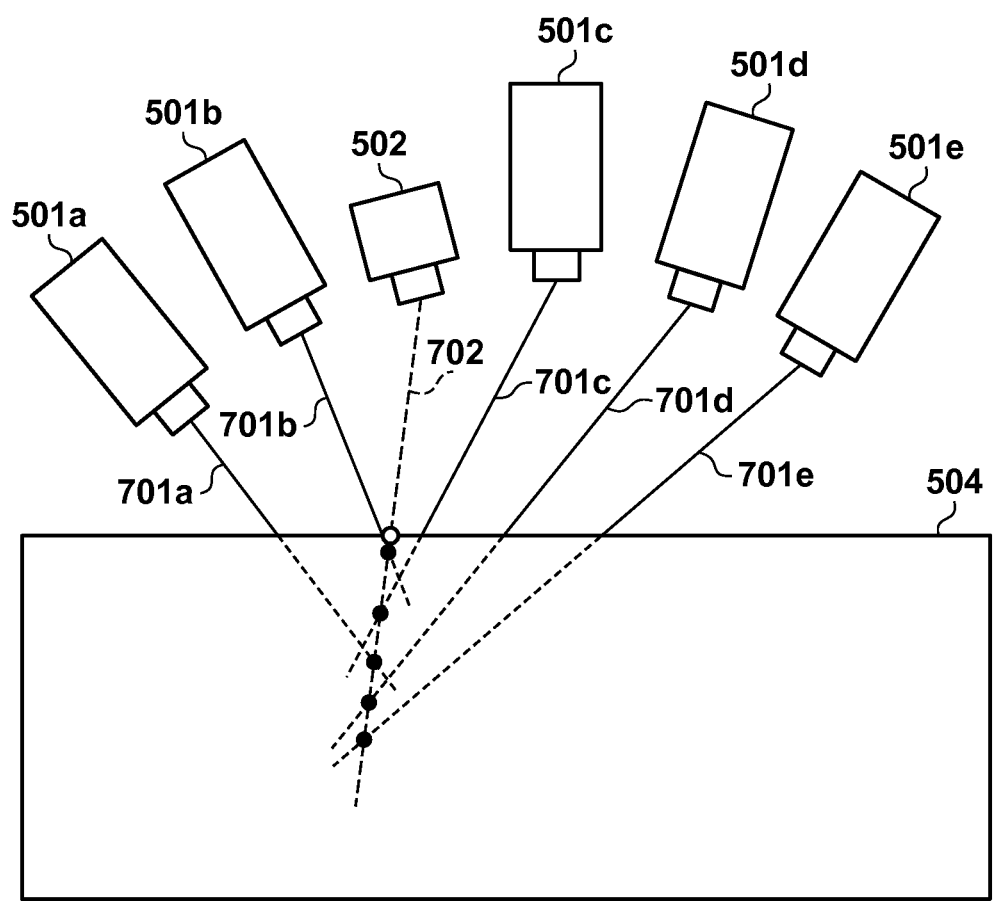
FIG. 19 is a diagram showing projection units respectively corresponding to certain peak positions, and directions of light rays therefrom.

With reference to FIG. 19, a description is given of the projection units corresponding to a given detected peak position and their light ray directions. When the peak position detected by the image capturing apparatus 502 is in the image capturing light ray direction indicated by a reference numeral 702, the corresponding light ray directions of the projection apparatuses 501a to 501e are represented by the spot light rays 701a to 701e. As shown in FIG. 19, when there are five projection apparatuses, five light ray directions can be obtained at maximum corresponding to the individual peak positions.

Figure 20:
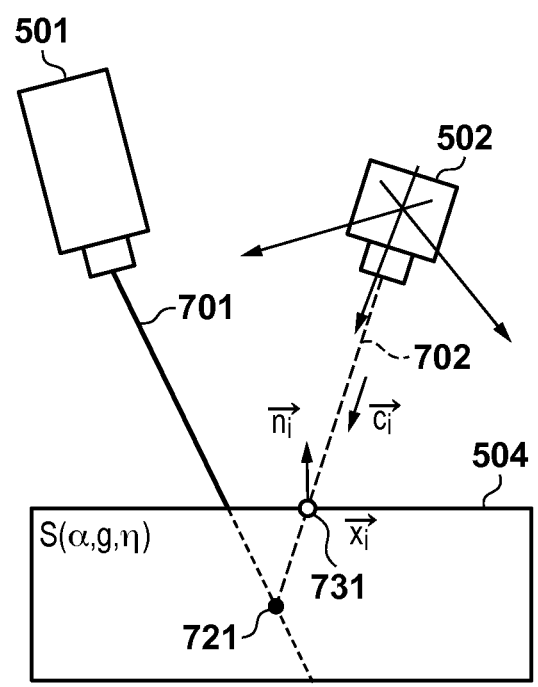
FIG. 20 is a diagram showing physical amounts (parameters) that are required for calculating three-dimensional coordinates of a surface position according to the fourth embodiment.

With reference to FIG. 20, the following describes physical amounts that are required for calculating the three-dimensional coordinates of the surface position on the measurement target object 504, and the parameters of the physical amounts. To simplify the description, it is assumed in the present embodiment that a local region of the measurement target object 504 is composed of flat surfaces. However, the shape is not necessarily represented by flat surfaces, and curved surfaces may be parameterized using a Bezier surface, a B-spline surface, an implicit function representation, or the like. In such cases, more correspondence relationships are required because parameters constituting the curved surface are also required to be obtained.

In a coordinate system with the point of origin inside the image capturing apparatus 502, when a sign ci denotes a vector having a direction toward a pixel i from the image capturing apparatus 502, a vector $x_i$, which indicates the three-dimensional position of a surface position 712, is represented by Expression 6 below.

$$\vec{x}_i(t) = t\vec{c}_i \qquad \text{Expression 6}$$

The orientation of the surface and the scattering properties at the position are the same as those represented by Expression 2 and Expression 3 described in the first embodiment.

Note that a sign t denotes a parameter indicating the distance from the image capturing apparatus 502. Since the other parameters are the same as those in the first embodiment, their description is omitted. In the present embodiment, the state of scattering observed with respect to the light ray directions of the projection apparatuses 501a to 501e associated with the direction toward the pixel i from the image capturing apparatus 502 (the light ray directions of the spot light rays with which the peak positions are located at the pixel i) are rendered (as images). This rendering is performed by the rendering method disclosed in Document 4, for example. By obtaining the luminance peak positions from the images obtained by rendering described above, and obtaining the parameters that equalize these peak positions with the peak positions (at the pixel i) actually observed, it is possible to obtain the three-dimensional position (vector $x_i$) at the incident surface position from the parameter t.

The properties of the parameter set concerning the shape and the scattering properties, which are required at the time of rendering, are the same as those described in the first embodiment, and thus the description thereof is omitted. However, in the present embodiment, it is not the number of image capturing apparatuses but the number of projection apparatuses that is plural, and regarding the number of projection apparatuses, the number of projection units required for calculation increases as the total number of parameters increases. Although five projection directions (five projection apparatuses) are used in the present embodiment, the number of required projection directions (the number of required projection apparatuses) varies depending on the shape and the model of the scattering properties. Usually, the number of required projection directions (projection apparatuses) increases as the number of parameters increases. In other words, the number of projection directions (projection apparatuses) is positively correlated with the number of parameters for the shape and the model representing the scattering properties. Preferably, the number of projection directions (projection apparatuses) constituting the plurality of projection directions is greater than or equal to the number of parameters that are adjusted and determined by the processes shown in FIG. 21.

Next, with reference to the flowchart shown in FIG. 21, a detailed description is given of the method for calculating the three-dimensional coordinates of the surface position in step S1805. The surface position calculating unit 608 determines each parameter such that the difference between the image position of the pattern of light in each captured image obtained in step S1803 and the image position obtained by a simulation based on the state of scattering of the pattern of light falls within a predetermined threshold range. Preferably, each parameter is determined with respect to all of the light ray directions associated with the plurality of projection directions. The surface position calculating unit 608 then calculates the three-dimensional coordinates of the surface position on the measurement target object 504 based on the determined parameter set. Note that there are cases where data considered as noise is obtained with respect to some of the projection directions due to the influence of a disturbance such as blockage, and it is therefore not necessary that the differences for all the associated light ray directions fall within the predetermined threshold range. If this is the case, it is only required that the differences for all the associated light ray directions except for noise data that is considered as an outlier fall within the predetermined threshold range.

First, in step S2101, the initialization processes are performed for the above-described five parameters. The following describes an example of the method for obtaining the initial values. First, regarding the initial value of the three-dimensional position (vector $x_i$), an apparent three-dimensional position is calculated from the light ray direction of the spot light ray corresponding to the peak position in the captured image obtained with respect to one of the projection apparatuses 501a to 501e, and the parameter t that can be obtained from this three-dimensional position is set as the initial value. Three-dimensional positions obtained in such a manner are points that are located deeper than the correct surface position on the measurement target object due to the influence of subsurface scattering.

Next, a description is given of the initial values of the parameters p and q, which determine the orientation of the surface. As shown in FIG. 22, a higher luminance of light observed as scattering from a projection unit in the captured image can be considered to indicate that the measurement target object 504 is irradiated with a spot light ray projected from a direction closer to the front direction. Considering this, the direction toward the projection apparatus that projects the spot light ray that is observed as the brightest among the spot light rays projected by projection apparatuses 501a to 501e is defined as the initial value of the orientation of the surface, and the parameters p and q that determine this orientation of the surface are set as the initial values. In the example shown in FIG. 22, the direction toward the projection apparatus 501d is the orientation of the surface.

Regarding the initial values of the anisotropy parameter g and the relative refraction index η of the scattering properties, it is known that in the case of plastic for example, the anisotropy parameter g falls within the range of 0.6 to 0.9 and the relative refraction index η falls within the range of 1.4 to 1.6. Therefore, appropriate values respectively selected from these ranges are set as the initial values. However, the method for determining the initial values are not limited to the method above. For example, the initial value of the orientation of the surface may be obtained by calculating the apparent three-dimensional coordinates of the surrounding points, performing principal component analysis for these points, and determining the third principle component as the orientation of the surface.

In step S2102, the peak position is calculated based on the given parameters. Given the parameters of the three-dimensional position, the orientation of the surface, and the scattering properties, it is possible to figure out where the peak positions related to the spot light rays projected in the light ray directions associated with the projection units 601a to 601e can be observed by the image capturing unit 602, using rendering technology or a physical simulator. In the present embodiment, as described above, rendering is performed by the rendering method disclosed in Document 4, and the peak position is calculated for each image obtained by the image capturing unit related to the influence of the corresponding projection unit.

Next, in step S2103, a comparison is made between the pixel i, which is the peak position detected in step S1803 from each of the captured images associated with the light ray directions of the individual projection units, and the peak positions calculated in step S2102 for the light ray directions associated with the individual projection units. When the actual peak position observed on the pixel i associated with the light ray direction of the projection unit j is denoted as $Q_{ij}^{obs}$, and the peak position obtained by rendering from the given five parameters is denoted as $Q_{ij}(t,p,q,g,\eta)$, the parameters are adjusted by Expression 7 below such that the calculated difference between these peak positions is the minimum.

$$|Q_{ij}^{obs} - Q_{ij}(t,p,q,g,\eta)| < T'  \qquad \text{Expression 7}$$

It is then determined whether or not the minimum value of the left-hand side of Expression 7 is smaller than a threshold value T' with respect to every projection unit j.

In step S2104, the processes end if the determination in step S2103 results in the minimum value for every projection unit j except for outliers being smaller than the threshold value T'. Otherwise, step S2105 is performed next.

In step S2105, a correction is made to the five parameters t, p, q, g, and η. The following method may be used as the correction method, for example. Rendering is performed by infinitesimally changing only one of the parameters, for example the parameter t, while fixing the other four parameters, and the left-hand side of Expression 7 is minimized, where the peak position thus detected is denoted as $Q_{ij}(t+\Delta,p,q,g,\eta)$. A corrected value $t_{new}$ for the parameter t in the case of minimization using the Newton method is determined by Expression 8 below.

$$t_{new} = t - \frac{\Delta Q_{ij}(t, p, q, g, \eta)}{Q_{ij}(t+\Delta, p, q, g, \eta) - Q_{ij}(t, p, q, g, \eta)} \quad \text{Expression 8}$$

Next, the same process as above is performed by infinitesimally changing only the parameter p while fixing the other four parameters. In this way, by repeatedly performing the process by infinitesimally changing only one of the parameters while fixing the other four parameters, the five parameters are corrected until the left-hand side of Expression 7 obtained for each projection apparatus becomes smaller than T' (until Expression 7 is fulfilled). Note that the correction method is not limited to the method using an image rendered by infinitesimally changing the parameters as described above. For example, in the case where the scattering properties can be represented with a simpler model formula, the peak position may be analytically obtained by representing the peak position as a mathematical expression using parameters as variables.

In this way, the surface position is calculated for the pixel i, and the parameters concerning the orientation of the surface and the scattering properties are also calculated.

As described above, according to the fourth embodiment, a comparison is made between the peak positions observed by the image capturing unit using spot light rays projected from the individual projection units, and the peak positions calculated by a simulation using, as parameters, the surface position on the measurement target object, the orientation of the surface, and the scattering properties. Obtaining accurate parameters with this comparison makes it possible to obtain an accurate surface position on the measurement target object even when the scattering properties of the measurement target object are unknown.

Other Embodiments

Figure 13:
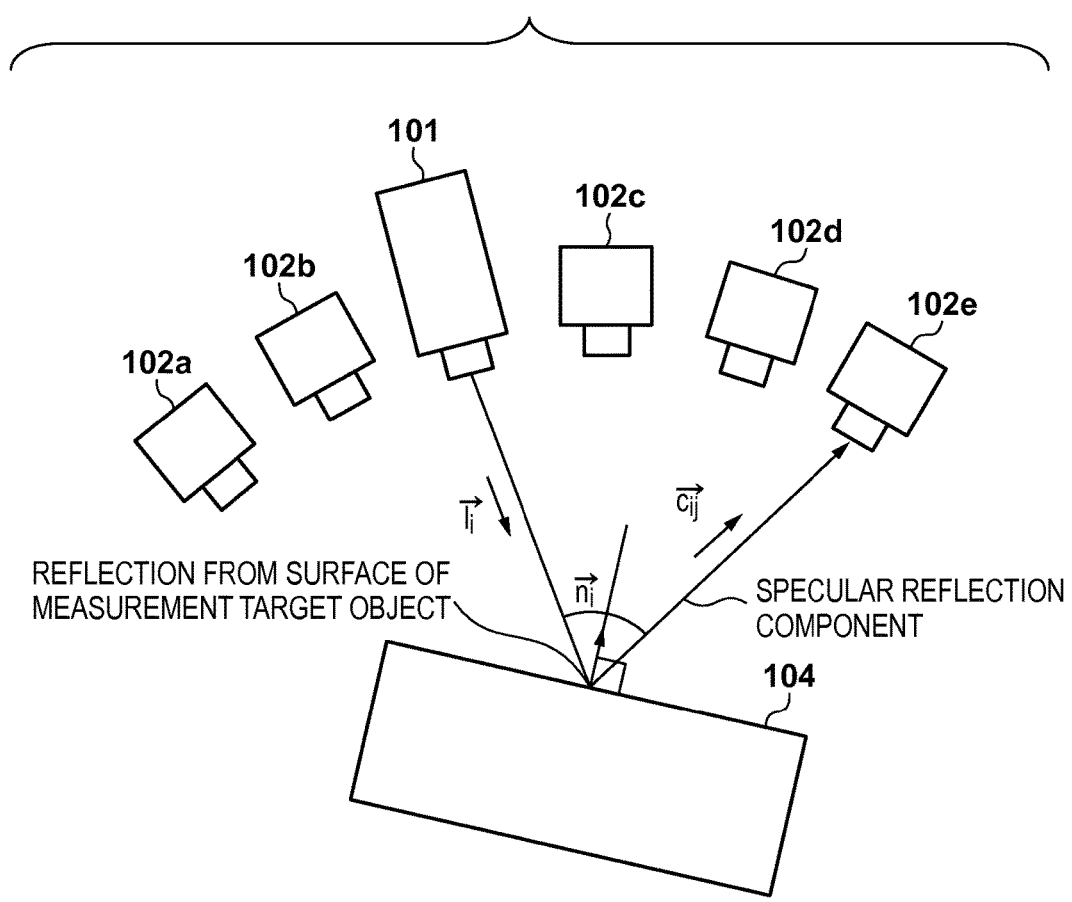
FIG. 13 is a diagram showing how a specular reflection component is observed.

In any of the first to third embodiments, it is assumed that image capturing performed by the image capturing units 202a to 202e with respect to the light rays projected from the projection unit 201 onto the measurement target object 104 is influenced by subsurface scattering, but the influence of the reflection light component is negligibly small. However, in cases where the surface of the measurement target object is glossy, a strong specular reflection component is observed in a direction that is close to the regular reflection direction. In such cases, the peak positions detected from the captured images obtained from the image capturing units 202a to 202e are influenced by the specular reflection component that reflects off the surface position on the measurement target object. For example, since the specular reflection component is observed in the regular reflection direction as shown in FIG. 13, the specular reflection component is observed by at most one image capturing unit. Considering this, in the case where the measurement target object 104 having a glossy surface is measured, at the time of calculating and evaluating the peak positions in step S702 and step S703, it is determined whether or not the orientation of the surface specified by the parameters with respect to each image capturing unit coincides with a direction that is close to the regular reflection direction. In the case where it is determined that the orientation of the surface coincides with a direction that is close to the regular reflection direction, calculation and evaluation may be performed by excluding the peak position obtained from the image captured by the corresponding image capturing unit.

Specifically, when a unit vector having a direction in which the $i^{th}$ slit light enters the surface position on the measurement target object 104 is denoted as a vector $l_i$;

a normal unit vector at the position where the slit light ray enters the measurement target object 104 is denoted as a vector $n_i$; and a unit vector having a direction from the incident position toward the image capturing unit j is denoted as a vector $c_{ij}$, and when the parameters p and q fulfilling Expression 9 below are used, the determination represented by Expression 4 is performed by excluding the peak position observed by the image capturing unit j.

$$\frac{\vec{c_{ij}} - \vec{l_1}}{|\vec{c_{ij}} - \vec{l_1}|} = \vec{n_1} = \left(p, q, \frac{1}{\sqrt{p^2 + q^2 + 1}}\right) \quad \text{Expression 9}$$

Also, there are cases where the specular reflection component is particularly strong, and it is thus possible to observe such a strong specular reflection component (highlight) that makes the influence of subsurface scattering, which is a scattering component, negligible. In such cases, the peak position of the image capturing unit located in the regular reflection direction may be regarded as the surface position on the measurement target object 104 and used for estimating the three-dimensional position. For example, in FIG. 13, it is assumed that a pattern is projected in the direction of the vector $l_i$ from the projection apparatus 101. In this situation, when the highlight is observed in the direction of the vector $c_i$ by the image capturing apparatus 102e, the parameters t, p, and q may be determined based on the position of the intersection of the vectors $l_i$ and $c_{ij}$, which is regarded as the surface position on the object, and the direction of equally dividing the angle formed by the vectors $l_i$ and $c_{ij}$ into two, which is regarded as the direction of the normal vector $n_i$. Whether or not the specular reflection component is strong can be determined based on, for example, whether or not the luminance value at the peak position is greater than or equal to a predetermined value (e.g., greater than or equal to 250 on a 256-level scale). As described above, in the case where a specular reflection component is observed, the three-dimensional shape of the measurement target object having a glossy surface can be more accurately measured by changing the processes for the peak position observed by the image capturing unit that is located in the regular reflection direction.

The first and forth embodiments above describe a configuration in which a plurality of image capturing apparatuses and one projection apparatus, or one image capturing apparatus and a plurality of projection apparatuses are used. In the first and fourth embodiments with such a configuration, the three-dimensional shape is obtained by obtaining the correspondence relationships between the light rays of the image capturing apparatuses and the light rays of the projection apparatuses, and adjusting the parameters representing the shape and the scattering properties so as to fulfill the correspondence relationships. If a consideration is given in the same framework, the parameters representing the shape and the scattering properties can be obtained by only obtaining a plurality of correspondence relationships between the light rays of the image capturing apparatuses and the light rays of the projection apparatuses, and accordingly it is possible to perform three-dimensional measurement in the same manner, even with a configuration in which there are a plurality of image capturing apparatuses and a plurality of projection apparatuses.

Specifically, with a plurality of image capturing apparatuses and a plurality of projection apparatuses, image capturing is performed with each of the image capturing apparatuses in the same manner as in the fourth embodiment such that the influences of the projection apparatuses can be separated from each other. Then, in the case of seeking a solution in the same frame work as in the first embodiment, a coordinate system with reference to the projection apparatus is considered as shown in FIG. 6, and the parameters are adjusted such that the correspondence relationship between the image capturing apparatuses fulfills Expression 4. In this case, since there are a plurality of projection apparatuses, the conditional expression represented as Expression 4 can be obtained for each projection apparatus. On the other hand, in the case of seeking a solution in the same frame work as in the fourth embodiment, a coordinate system with reference to the image capturing apparatus is considered as shown in FIG. 20, and the parameters are adjusted such that the correspondence relationship between the projection apparatuses fulfills Expression 7. Also in this case, the conditional expression represented as Expression 7 can be obtained for each image capturing apparatus. In this way, a plurality of conditional expressions concerning Expression 4 and Expression 7 can be obtained. The parameters may be determined by using either one of the conditional expressions, or by using a plurality of conditional expressions obtained from each expression after adding a constraint condition that the same surface position has the same normal line and the same scattering properties to the plurality of conditional expressions.

A plurality of correspondence relationships can also be obtained by using a single image capturing apparatus and a single projection apparatus and performing measurement while moving either one or both of them with a robot arm or the like. Therefore, three-dimensional measurement can be performed in the same manner as in the case of using a plurality of image capturing apparatuses and a plurality of projection apparatuses as described above.

As described above, when a measurement target object including a translucent part is irradiated with a pattern of light, each embodiment makes it possible to accurately obtain the reflection position on the surface even when there is the influence of scattering or the like, and to reliably perform three-dimensional measurement with high accuracy. In a three-dimensional measurement apparatus, it is possible to correct the influence of the internal scattering or the like of the measurement target object, and to improve the measurement accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-243374 filed Dec. 1, 2014 and 2015-198797 filed Oct. 6, 2015, which are hereby incorporated by reference herein in their entirety.

What is claimed is:

1. A three-dimensional measurement apparatus, comprising:
    a projector configured to project a pattern onto a measurement target object from one or more projection directions;
    an image capturing device configured to obtain one or more captured images by capturing an image of the measurement target object from one or more view points;
    one or more processors; and
    at least one memory coupled to the one or more processors, the at least one memory having instructions stored thereon which, when executed by the one or more processors, cause the three-dimensional measurement apparatus to:
    obtain, from the one or more captured images, a position of the pattern projected onto the measurement target object;
    calculate three-dimensional coordinates of a surface of the measurement target object based on the position of the pattern obtained from the one or more captured images and a position of a pattern estimated based on a parameter set that represents internal scattering of the measurement target object; and
    adjust each parameter included in the parameter set such that a difference between the position obtained from the one or more captured images and the position obtained based on the parameter set falls within a predetermined threshold range with respect to either one or both of: two or more view points, and two or more projection directions.

2. The three-dimensional measurement apparatus according to claim 1, wherein the instructions, when executed by the one or more processors, further cause the three-dimensional measurement apparatus to determine the parameter set based on the position of the pattern obtained from the one or more captured images and a model representing the internal scattering.

3. The three-dimensional measurement apparatus according to claim 2,
wherein the instructions, when executed by the one or more processors, further cause the three-dimensional measurement apparatus to determine the parameter set by adjusting parameters included in a preliminarily-retained parameter set based on a position of the pattern obtained based on the preliminarily-retained parameter set and the position of the pattern obtained from the one or more captured images.

4. The three-dimensional measurement apparatus according to claim 3,
wherein the instructions, when executed by the one or more processors, further cause the three-dimensional measurement apparatus to obtain a position of the pattern projected in the one or more projection directions and observed by the image capturing device from the one or more view points based on the preliminarily-retained parameter set, and adjusts each parameter included in the parameter set based on the position of the pattern obtained from the one or more captured images and the position obtained based on the parameter set.

5. The three-dimensional measurement apparatus according to claim 4,
wherein the instructions, when executed by the one or more processors, further cause the three-dimensional measurement apparatus to obtain the position of the pattern from an image obtained by rendering a state of scattering of the pattern based on the preliminarily-retained parameter set.

6. The three-dimensional measurement apparatus according to claim 3,
wherein the preliminarily-retained parameter set includes a parameter of an orientation of the surface at a surface position on the measurement target object.

7. The three-dimensional measurement apparatus according to claim 3, wherein the at least one memory is further configured to store a parameter of scattering properties of the measurement target object, and
wherein the instructions, when executed by the one or more processors, further cause the three-dimensional measurement apparatus to determine the parameter set by adjusting parameters included in the preliminarily-retained parameter set except for the parameter of the scattering properties, using the parameter of the scattering properties read out from the at least one memory.

8. The three-dimensional measurement apparatus according to claim 3,
wherein the instructions, when executed by the one or more processors, further cause the three-dimensional measurement apparatus to, when performing parameter adjustment, exclude a captured image that is heavily influenced by a specular reflection component reflected off the surface of the measurement target object from a target of adjustment of a parameter of scattering properties.

9. The three-dimensional measurement apparatus according to claim 8,
wherein the instructions, when executed by the one or more processors, further cause the three-dimensional measurement apparatus to, when a highlight having a luminance value greater than a predetermined value is observed in the captured image that is heavily influenced by the specular reflection component, determine a part of the parameter set using reflection from the surface of the measurement target object in disregard of an influence of a scattering component.

10. The three-dimensional measurement apparatus according to claim 2,
wherein a number of view points constituting the one or more view points, a number of projection directions constituting the one or more projection directions, or a product of the number of view points and the number of projection directions is greater than or equal to a number of parameters to be adjusted.

11. The three-dimensional measurement apparatus according to claim 1,
wherein the instructions, when executed by the one or more processors, further cause the three-dimensional measurement apparatus to, when a surface position on the measurement target object calculated from each of the one or more captured images is located within an area having a predetermined size, calculate the three-dimensional coordinates of the surface of the measurement target object based on at least one of the one or more captured images.

12. The three-dimensional measurement apparatus according to claim 1,
wherein the instructions, when executed by the one or more processors, further cause the three-dimensional measurement apparatus to, when a surface position on the measurement target object calculated from each of the one or more projection directions is located within an area having a predetermined size, calculate the three-dimensional coordinates of the surface of the measurement target object based on at least one of the one or more projection directions.

13. The three-dimensional measurement apparatus according to claim 1,
wherein the image capturing device includes a plurality of image capturing apparatuses respectively located at a plurality of view points.

14. The three-dimensional measurement apparatus according to claim 1,
wherein the image capturing device captures images of the measurement target object by moving an image capturing apparatus to each of a plurality of view points.

15. The three-dimensional measurement apparatus according to claim 1,
wherein the projector has a plurality of projection apparatuses respectively located in a plurality of projection directions.

16. The three-dimensional measurement apparatus according to claim 1,
wherein the projector projects the pattern onto the measurement target object by moving a projection apparatus to each of a plurality of projection directions.

17. A control method of a three-dimensional measurement control apparatus, the method comprising:
projecting a pattern onto a measurement target object from one or more projection directions;

obtaining one or more captured images by capturing an image of the measurement target object from one or more view points;

obtaining, from the one or more captured images, a position of the pattern projected onto the measurement target object;

calculating three-dimensional coordinates of a surface of the measurement target object based on the position of the pattern obtained from the one or more captured images and a position of the pattern estimated based on a parameter set that represents internal scattering of the measurement target object; and adjusting each parameter included in the parameter set such that a difference between the position obtained from the one or more captured images and the position obtained based on the parameter set falls within a predetermined threshold range with respect to either one or both of: two or more view points, and two or more projection directions.

18. A non-transitory computer readable storage medium storing therein a program for causing a computer to perform a three-dimensional measurement control method, the three-dimensional measurement control method comprising:

projecting a pattern onto a measurement target object from one or more projection directions;

obtaining one or more captured images by capturing an image of the measurement target object from one or more view points;

obtaining, from the one or more captured images, a position of the pattern projected onto the measurement target object;

calculating three-dimensional coordinates of a surface of the measurement target object based on the position of the pattern obtained from the one or more captured images and a position of the pattern estimated based on a parameter set that represents internal scattering of the measurement target object; and adjusting each parameter included in the parameter set such that a difference between the position obtained from the one or more captured images and the position obtained based on the parameter set falls within a predetermined threshold range with respect to either one or both of: two or more view points, and two or more projection directions.

19. A three-dimensional measurement apparatus, comprising:

a projector configured to project a pattern onto a measurement target object from one or more projection directions;

an image capturing device configured to obtain one or more captured images by capturing an image of the measurement target object from one or more view points;

one or more processors; and at least one memory coupled to the one or more processors, the at least one memory having instructions stored thereon which, when executed by the one or more processors, cause the three-dimensional measurement apparatus to:

obtain, from the one or more captured images, a position of the pattern projected onto the measurement target object;

determine a parameter set that represents internal scattering of the measurement target object based on the position of the pattern obtained from the one or more captured images;

calculate three-dimensional coordinates of a surface of the measurement target object based on the determined parameter set; and adjust each parameter included in the parameter set such that a difference between the position obtained from the one or more captured images and the position obtained based on the parameter set falls within a predetermined threshold range with respect to either one or both of: two or more view points, and two or more projection directions.

* * * * *